United States Patent
Johansson et al.

(10) Patent No.: US 9,338,710 B2
(45) Date of Patent: May 10, 2016

(54) DATA FORWARDING DURING HANDOVER IN A SELF-BACKHAULED CELL

(76) Inventors: Niklas Johansson, Sollentuna (SE);
Gunnar Mildh, Sollentuna (SE);
Andras Racz, Budapest (HU)

(*) Notice: Subject to any disclaimer, the term of this patent is extended or adjusted under 35 U.S.C. 154(b) by 790 days.

(21) Appl. No.: 12/992,004

(22) PCT Filed: Sep. 9, 2008

(86) PCT No.: PCT/SE2008/051005
§ 371 (c)(1),
(2), (4) Date: Nov. 10, 2010

(87) PCT Pub. No.: WO2009/139679
PCT Pub. Date: Nov. 19, 2009

(65) Prior Publication Data
US 2011/0075633 A1    Mar. 31, 2011

Related U.S. Application Data

(60) Provisional application No. 61/053,366, filed on May 15, 2008.

(51) Int. Cl.
*H04B 7/14*       (2006.01)
*H04W 36/02*   (2009.01)
(Continued)

(52) U.S. Cl.
CPC .............. *H04W 36/02* (2013.01); *H04W 16/26* (2013.01); *H04W 84/047* (2013.01)

(58) Field of Classification Search
CPC ....................................... H04W 36/02–36/026
USPC ................................................. 370/310–350
See application file for complete search history.

(56) References Cited

U.S. PATENT DOCUMENTS

2005/0007994 A1    1/2005   Fukuzawa et al.
2007/0086388 A1    4/2007   Kang et al.
(Continued)

FOREIGN PATENT DOCUMENTS

EP      1 775 984 A     4/2007
EP      1 775 984 A2    4/2007
(Continued)

OTHER PUBLICATIONS

Altshuller et al. "Wireless Communications Network Base Station Extension", U.S. Appl. No. 60/960,902, filed Oct. 19, 2007.
(Continued)

*Primary Examiner* — Andrew Chriss
*Assistant Examiner* — Kenan Cehic
(74) *Attorney, Agent, or Firm* — Myers Bigel & Sibley, P.A.

(57) ABSTRACT

A method is implemented in an anchor eNodeB of a network, where the anchor eNodeB communicates with a self-backhauled eNodeB via a radio interface and where the network further includes another eNodeB. The method includes determining whether a user equipment (UE) is being handed off from the first self-backhauled eNodeB to the other eNodeB. The determining is based on: receiving (820) a message from the self-backhauled eNodeB via the radio interface instructing the anchor eNodeB to stop delivering packets that are destined for the UE, or sniffing (1 105, 1 1 10, 1 1 15) into one or more messages sent from the self-backhauled eNodeB to the other eNodeB to identify that the UE is being handed off from the self-backhauled eNodeB to the other eNodeB. The method further includes storing (1 120), based on the determination of whether the UE is being handed off, received packets intended for the UE: and forwarding (1 120) the stored packets to the other eNodeB via a transport network for delivery to the UE.

19 Claims, 15 Drawing Sheets

(51) Int. Cl.
   *H04W 16/26*   (2009.01)
   *H04W 84/04*   (2009.01)

(56) References Cited

U.S. PATENT DOCUMENTS

| | | | |
|---|---|---|---|
| 2008/0040507 A1* | 2/2008 | Hsu et al. | 709/238 |
| 2008/0056172 A1* | 3/2008 | Nakatsugawa | 370/315 |
| 2008/0062911 A1* | 3/2008 | Choi et al. | 370/315 |
| 2008/0108326 A1 | 5/2008 | Park et al. | |
| 2008/0144552 A1* | 6/2008 | Johansson et al. | 370/310 |
| 2008/0176566 A1* | 7/2008 | Akita | H04W 36/32 455/436 |
| 2008/0232324 A1 | 9/2008 | Tajima et al. | |
| 2009/0103492 A1 | 4/2009 | Altshuller et al. | |
| 2009/0252077 A1* | 10/2009 | Khandekar | H04W 72/082 370/312 |
| 2010/0034148 A1* | 2/2010 | Zhang et al. | 370/328 |
| 2010/0210297 A1* | 8/2010 | Simonsson | H04W 52/146 455/522 |
| 2012/0163343 A1* | 6/2012 | Ahluwalia | 370/331 |

FOREIGN PATENT DOCUMENTS

| | | |
|---|---|---|
| JP | 2005-012718 | 1/2005 |
| JP | 2006-311253 | 11/2006 |
| JP | 2007-116696 | 5/2007 |
| WO | WO 2007/074514 | 7/2007 |
| WO | WO 2008/023814 | 2/2008 |
| WO | WO 2008/023814 A | 2/2008 |
| WO | WO 2009/134178 A1 | 11/2009 |

OTHER PUBLICATIONS

International Search Report, PCT Application No. PCT/SE2008/051005, Mailed Feb. 19, 2009.

International Preliminary Report on Patentability, PCT/SE2008/051005, Date of Completion Jun. 18, 2010.

Ericsson "A discussion on some technology components for LTE-Advanced" TSG-RAN WG1 #53, Kansas City, MO., May 5-9, 2008, pp. 1-11.

Kanchei et al. "MS handover with Non-transparent RS" IEEE 802.16 Broadband Wireless Access Working Group (http://ieee802.org/16) Mar. 5, 2007, pp. 0-7.

Shen et al. "Handover Schemes in IEEE802.16j" IEEE 802.16 Presentation Submission Template (Rev. 8.3), retrieved from the Internet http://www.ieee802.org/16/relay/contrib/C802161-06_055rl.pdfm, submitted May 8, 2006.

Ericcson: "A discussion on some technology components for LTE-Advanced", 3GPP Draft; R1-082024 {LTE-Advanced Technology Components}, $3^{rd}$ Generation Partnership Project (3GPP), vol. TSG-RAN WG1 #53, Kansas City, Missouri, USA, May 5-9, 2008.

European Search Report Corresponding to European Application No. 11193228.1; Dated Mar. 27, 2012; 10 pages.

Kanchei Loa et al., "MS handover with Non-tranparent RS", *IEEE 802.16 Broadband Wireless Access Working Group*, Mar. 6, 2007, pp. 0-7, Retrieved from the Internet: URL: http://www.ieee802.org/16/relay/contrib/C80216j-07_072r1.pdf.

Shen Gang et al., "Handover Schemes in IEEE802.16j", Internet Citation, May 8, 2006, Retrieved from the Internet: URL: http://www.ieee802.orq/16/relay/contrib/C80216j-06_005r1.pdf.

Mexican Office Action Corresponding to Application No. MX/a/2010/011516; Dated Nov. 18, 2011, 22 pages.

Japanese Office Action Corresponding to Japanese Patent Application No. JP2012-076572; Mailing Date: Jun. 4, 2013; 2 Pages.

U.S. Appl. No. 61/048,980, "Method and Arrangement in a Telecommunication System", filed Apr. 30, 2008, 36 Pages.

3GPP TS 36.300 V8.4.0 (Mar. 2008), $3^{rd}$ Generation Partnership Project; Technical Specification Group Radio Access Network; Evolved Universal Terrestrial Radio Access (EUTRA) and Evolved Universal Terrestrial Radio Access Network (E-UTRAN); Overall description; Stage 2 (Release 8), 126 pages, Mar. 2008.

3GPP TS 23.401 V8.1.0 (Mar. 2008), $3^{rd}$ Generation Partnership Project; Technical Specification Group Services and System Aspects; General packet Radio Service (GPRS) enhancements for Evolved Universal Terrestril Radio Access Network (E-UTRAN) access (Release 8), 171 pages, Mar. 2008.

* cited by examiner

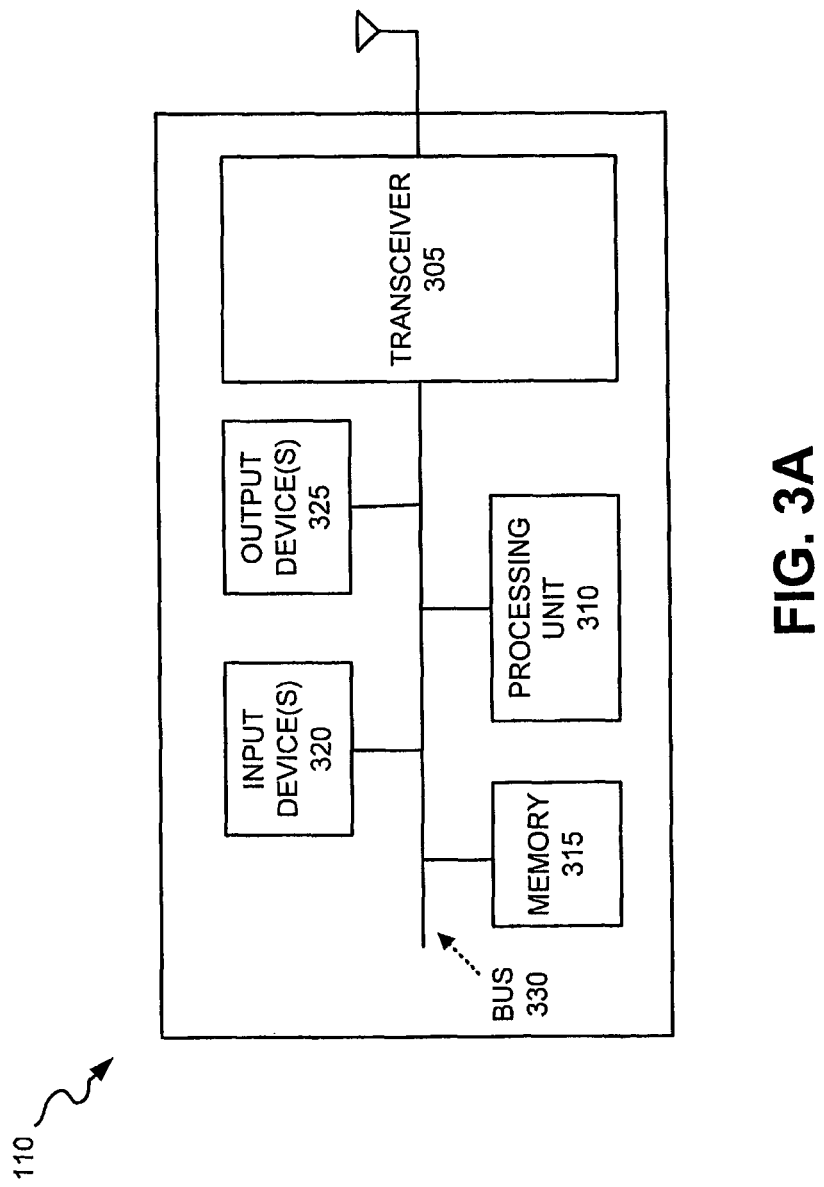

DATA FORWARDING DURING HANDOVER IN A SELF-BACKHAULED CELL

CROSS REFERENCE TO RELATED APPLICATIONS

This application is a 35 U.S.C. § 371 national stage application of PCT International Application No. PCT/SE2008/051005, filed on Sep. 9, 2008, which claims the benefit of priority of U.S. Provisional Application No. 61/053,366, filed May 15, 2008. The above-referenced PCT International Application was published in the English language as International Publication No. WO 2009/139679 on Nov. 19, 2009. The disclosures of both of the above referenced applications are hereby incorporated herein in their entireties by reference.

TECHNICAL FIELD

Implementations described herein relate generally to wireless communication systems and, more particularly, to forwarding data during handover in a communication system employing a self-backhauled base station.

BACKGROUND

The $3^{rd}$ Generation Partnership Project (3GPP) standardization body is currently working on the specification of the evolved 3G mobile system, where the core network related evolution of the architecture is often referred to as SAE (System Architecture Evolution) or Evolved Packet Core (EPC), while the Radio Access Network (RAN) evolution is referred to as Long Term Evolution(LTE) or Evolved Universal Terrestrial Radio Access Network (E-UTRAN). The name SAE/LTE or Evolved Packet System (EPS) refers to the overall system. The Release 8 specification of the 3GPP standard, which is to be completed in 2008, will include the specification of the SAE/LTE evolved system. For an overall description of the LTE part of the architecture see 3GPP TS 36.300 "E-UTRA, E-UTRAN Overall Description" and for the SAE part see 3GPP TS 23.401 "General Packet Radio Service (GPRS) Enhancements for E-UTRAN Access."

The SAE/LTE architecture is also often called as a two-node architecture, as logically there are only two nodes involved—both in the user and control plane paths—between the User Equipment (UE) and the core network. These two nodes are the base station, called eNodeB in 3GPP terminology and the Serving Gateway (S-GW) in the user plane, and the Mobility Management Entity (MME) in the control plane. There may be multiple S-GW and MME nodes in a network.

The S-GW executes generic packet processing functions similar to router functions, including packet filtering and classification. The MME terminates the so called Non-Access Stratum (NAS) signaling protocols with the UE and maintains the UE context including the established bearers, the security context as well as the location of the UE.

In the LTE architecture, the radio link specific protocols, including Radio Link Control (RLC) and Medium Access Control (MAC) protocols are terminated in the eNodeB. In the control plane, the eNodeB uses the Radio Resource Control (RRC) protocol to execute the longer time scale radio resource control toward the UE, such as, for example, the establishment of radio bearers with certain Quality of Service (QoS) characteristics, the control of UE measurements or the control of handovers.

The network interface between the eNodeB and the EPC network is called the S1 interface, which has a control plane part (S1-CP) connecting to the MME and a user plane part (S1-UP) connecting to the S-GW. The user plane part of the S1 interface is based on the GPRS Tunneling Protocol (GTP). The tunneling mechanism is needed in order to ensure that the Internet Protocol (IP) packets destined to the UE can be delivered to the correct eNodeB where the UE is currently located. For example, the original IP packet is encapsulated into an outer IP packet that is addressed to the proper eNodeB.

The S1 control plane protocol is called S1-AP and it is carried on top of Stream Control Transmission protocol (SCTP)/IP. The MME uses the S1-AP protocol to talk to the eNodeB, e.g. to request the establishment of radio bearers to support the QoS services for the UE. There is a network interface also between neighbor eNodeBs, which is called the X2 interface, and it has a similar protocol structure as the S1 interface with the exception that the control protocol is called X2-AP. The X2 interface is primarily used for the execution of the handover of a UE from one eNodeB to the other but it is also used for the inter-cell coordination of other Radio Resource Management functions, such as Inter-Cell Interference Coordination. During a handover execution, the source eNodeB talks to the target eNodeB via the X2-AP protocol to prepare the handover and during the handover execution it forwards the pending user plane packets to the target eNodeB, which are to be delivered to the UE once it has arrived at the target eNodeB. The packet forwarding is done via the X2 user plane which is using the GTP tunneling protocol similar to the user plane on the S1 interface.

The network infrastructure that is used to connect the different network nodes, e.g., the eNodeB's, MME's and S-GW's, is an IP based transport network, which can include L2 networks with different technologies, i.e., SDH links, Ethernet links, Digital Subscriber Line (DSL) links or Microwave links, etc. The type of transport network and L2 technologies employed is a deployment issue, depending on the availability, cost, ownership, operator preferences, etc., of such networks in the particular deployment scenario. However, it is generally true that the costs related to the transport network often play a significant part of the overall operation costs of the network.

In a further enhancement of the LTE system, called LTE-Advanced. 3GPP discusses possible solutions to use the LTE radio interface from an eNodeB not only for serving UEs but also for serving as a backhaul link to connect to other eNodeBs. That is, an eNodeB can provide the transport network connectivity for other eNodeBs utilizing an LTE radio connection via the other eNodeBs. This method is called self-backhauling since the radio link itself is used also as a transport link for some of the base stations. In an LTE system employing self-backhauling, an eNodeB that is connected to the network via a radio connection is referred to as self-backhauled eNodeB, or B-eNodeB for short, while the eNodeB that is providing the backhaul radio connection for other eNodeB(s) is called the anchor eNodeB, or A-eNodeB for short ("eNodeB," by itself, refers to regular eNodeBs, which are neither self-backhauled nor anchor eNodeBs).

SUMMARY

Exemplary embodiments described herein present a number of solutions regarding improving self-backhauling in wireless telecommunication systems. In one solution, packet forwarding from the anchor eNodeB is "shortcut," thereby avoiding the unnecessary overhead on the radio backhaul link at packet forwarding. To shortcut the forwarding from the anchor eNodeB, two main alternative solutions are proposed herein where a first solution may be based on a signaling mechanism, introduced between the B-eNodeB and the A-eNodeB, that is used by the B-eNodeB to control the forwarding from the A-eNodeB. In a second solution, the A-eNodeB acts autonomously and it detects from the sniffing of normal X2 and S1 signaling when a handover is ongoing and then executes forwarding autonomously. In another solution, the X2 traffic at the anchor eNodeB is "broke out" in order to avoid the inefficient routing via the S-GW. To breakout X2 traffic at the anchor eNodeB, it is proposed to integrate the S-GW functionality for the self-backhauled eNodeB originated traffic (i.e., for the X2 traffic) into the anchor eNodeB and use a separate bearer for the B-eNodeB to carry the X2 traffic.

According to one aspect, a method may be implemented in an anchor eNodeB of a network, where the anchor eNodeB communicates with a self-backhauled eNodeB via a radio interface and where the network further includes another eNodeB. The method may include determining whether a user equipment (UE) is being handed off from the first self-backhauled eNodeB to the other eNodeB, where the determining is based on: receiving a message from the self-backhauled eNodeB via the radio interface instructing the anchor eNodeB to stop delivering packets that are destined for the UE, or sniffing into one or more messages sent from the self-backhauled eNodeB to the other eNodeB to identify that the UE is being handed off from the self-backhauled eNodeB to the other eNodeB. The method may further include storing, based on the determination of whether the UE is being handed off, received packets intended for the UE; and forwarding the stored packets to the other eNodeB via a transport network for delivery to the UE.

According to a further aspect, a first base station may connect to a second base station in a network via a radio interface, where the first base station receives packets destined for a user equipment (UE) on a downlink from the second base station and receives packets on an uplink from the UE. The first base station may include a transceiver configured to: send a handover request, associated with the UE, via the radio interface to the second base station for delivery to a target handover base station, receive a handover response from the second base station via the radio interface, where the handover response was sent from the target handover base station, and send a notification message to the second base station instructing the second base station to stop delivering downlink packets destined for the UE. The first base station may further include a memory configured to store packets previously received from the second base station that are destined for the UE. The first base station may also include a processing unit configured to: retrieve the packets stored in the memory prior to receipt of the handover response, and pass the retrieved packets to the transceiver for sending to the second base station via the radio interface for delivery to the target handover base station.

According to another aspect, a system associated with a cellular network may include a first base station connected to a user equipment (UE) and to a second base station via a first radio interface, the second base station connected to a transport network. The system may further include a third base station connected to the transport network and a fourth base station connected to the third base station via a second radio interface, where the fourth base station is configured to provide wireless service to the UE. The first base station may be configured to: send a handover request associated with the UE to the fourth base station via the second base station, the transport network, and the third base station and receive a handover response from the fourth base station via the third base station, the transport network and the second base station, where the handover response grants handover of the UE (110-3) from the first base station (130) to the fourth base station (150). The first base station may be further configured to: forward packets destined for the UE to the fourth base station via the second base station, the transport network and the third base station for delivery to the UE.

BRIEF DESCRIPTION OF THE DRAWINGS

FIG. 3A illustrates exemplary components of a UE of FIG. 1;

DETAILED DESCRIPTION

The following detailed description of the invention refers to the accompanying drawings. The same reference numbers in different drawings may identify the same or similar elements. Also, the following detailed description does not limit the invention.

Figure 1:
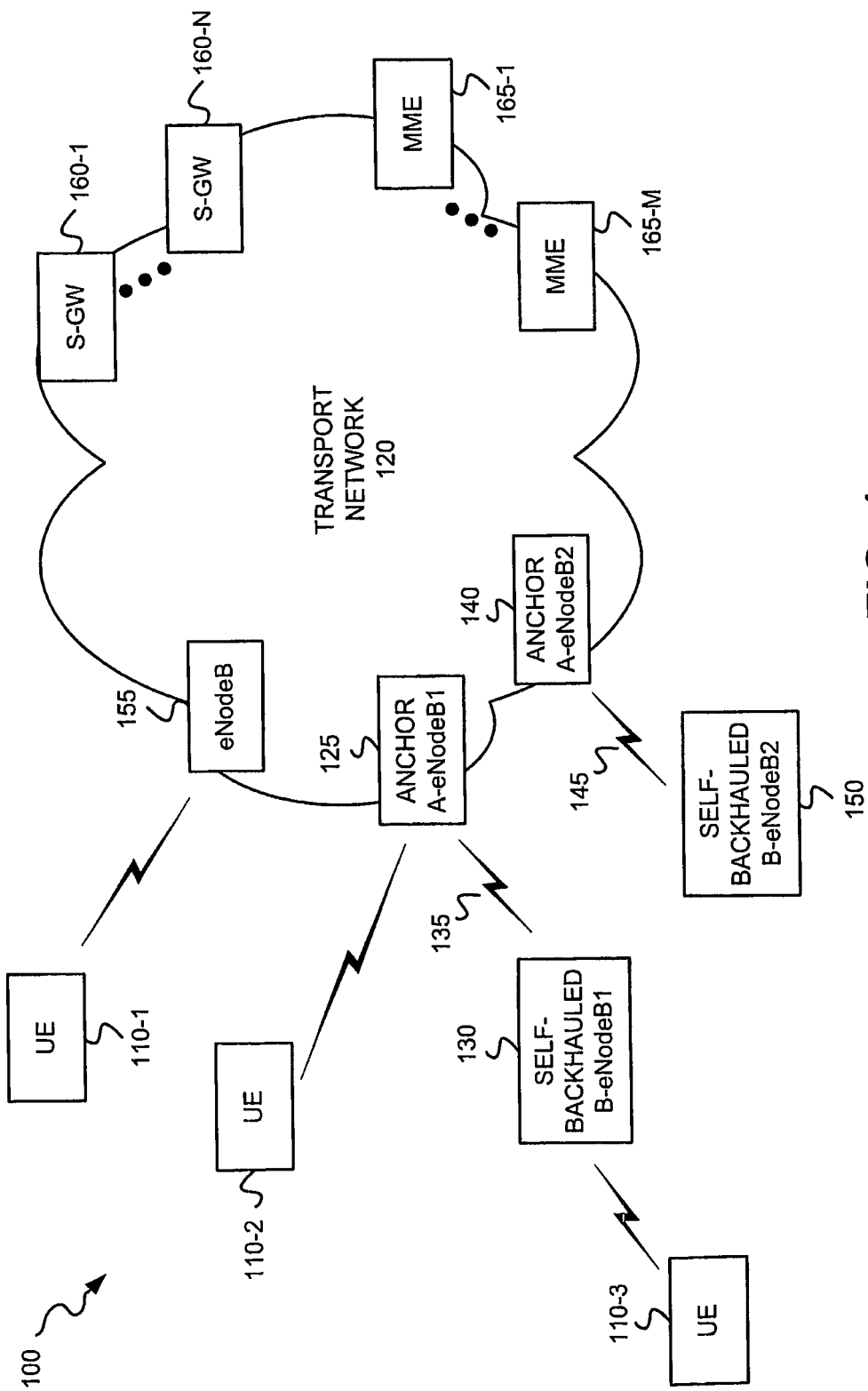
FIG. 1 illustrates an exemplary communications system that includes one or more self-backhauled eNodeBs.

FIG. 1 illustrates an exemplary communications system 100 that may include UE devices 110-1, 110-2 and 110-3 connected to an SAE/LTE network, which may include eNodeB nodes, MME nodes, and S-GW nodes, all connected via a transport network 120. As shown in FIG. 1, system 100 may include an anchor eNodeB 125 (A-eNodeB1) that connects to a self-backhauled eNodeB (B-eNodeB1) via a radio interface 135 and an anchor eNodeB 140 (A-eNodeB2) that connects to a self-backhauled eNodeB (B-eNodeB2) via a radio interlace 145. Anchor eNodeB 125 and anchor eNodeB 140 may serve UEs in addition to providing a "backhaul" link(s) to connect to other eNodeBs, such as self-backhauled eNodeB 130 and self-backhauled eNodeB 150. Anchor eNodeB 125 may, thus, use radio interface 135 to provide a transport link for self-backhauled eNodeB 130 and anchor eNodeB 140 may use radio interface 145 to provide a transport link for self-backhauled eNodeB 150. A "self-backhauled eNodeB" as referred to herein includes an eNodeB that is connected to transport network 120 via a radio connection. An "anchor eNodeB" as referred to herein includes an eNodeB that provides a backhaul radio connection for one or more other eNodeBs (e.g. for self-backhauled eNodeBs).

Two anchor eNodeBs and self-backhauled eNodeBs are depicted in FIG. 1 for purposes of simplicity. System 100, however, may include fewer or more anchor eNodeBs and self-backhauled eNodeBs than those shown in FIG. 1. System 100 may further include one or more other eNodeBs (e.g., eNodeB 155 shown in FIG. 1) in addition to anchor eNodeBs 125 and 140, where the other eNodeBs may not provide back-haul links to other eNodeBs. These other eNodeBs (e.g., eNodeB 155) include eNodeBs that are neither anchor eNodeBs nor self-backhauled eNodeBs.

System 100 may additionally include one or more serving gateways (S-GW) 160-1 through 160-N, and one or more mobility management entities (MMEs) 165-1 through 165-M.

UE devices 110-1 through 110-3 may include, for example, a cellular radiotelephone, a personal digital assistant (PDA), a Personal Communications Systems (PCS) terminal, a laptop computer, a palmtop computer, or any other type of device or appliance that includes a communication transceiver that permits UE devices 110 to communicate with other devices via a wireless link. The PCS terminal may, for example, combine a cellular radiotelephone with data processing, facsimile and data communications capabilities. The PDA may include, for example, a radiotelephone, a pager, an Internet/intranet access device, a web browser, an organizer, calendars and/or a global positioning system (GPS) receiver. UE devices 110 may be referred to as a "pervasive computing" device.

Transport network 120 may include one or more networks of any type, including a local area network (LAN); a wide area network (WAN); a metropolitan area network (MAN): a satellite network; an intranet, the Internet: or a combination of networks. eNodeBs 125-155. S-GWs 160-1 through 160-N and MMEs 165-1 through 165-M may reside in an SAE/LTE network and may be connected via transport network 120.

Figure 2:
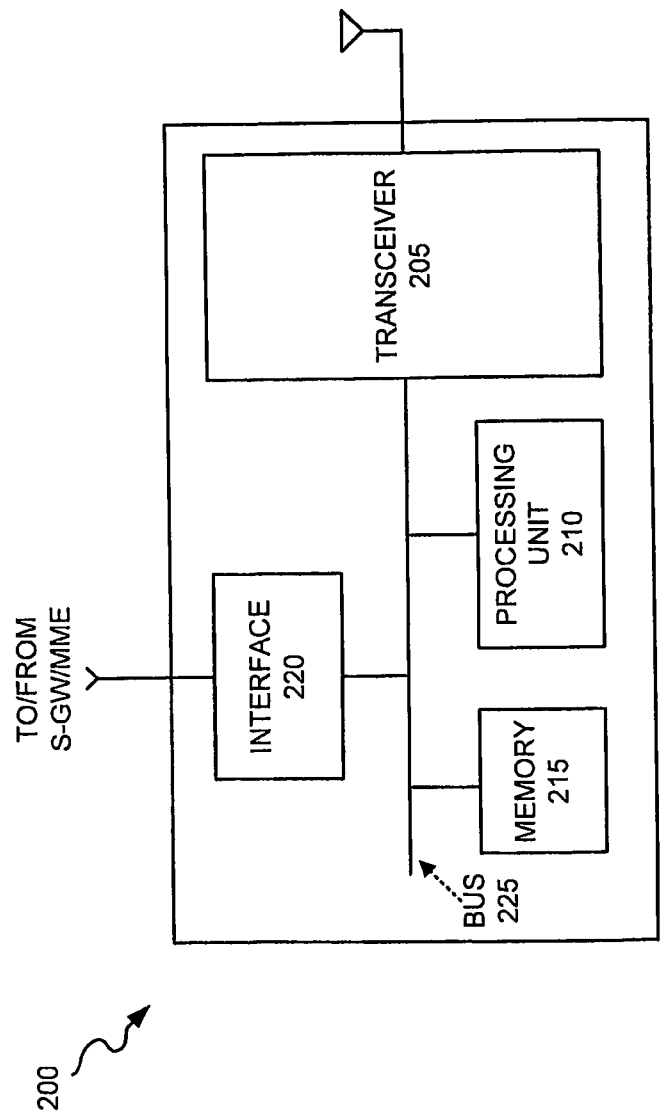
FIG. 2 illustrates exemplary components of a device that may correspond to the anchor eNodeBs and/or self-backhauled eNodeBs of FIG. 1.

FIG. 2 illustrates an exemplary implementation of a device 200, that may correspond to anchor eNodeBs 125 and 140, self-backhauled eNodeBs 130 and 150 and eNodeB 155. Device 200 may include a transceiver 205, a processing unit 210, a memory 215, an interface 220 and a bus 225. Device 200 may omit a wired interface 220 when device 200 corresponds to self-backhauled eNodeBs 130 or 150 (though device 200 may still have a logical interface to a MME 165 and/or a S-GW 160).

Transceiver 205 may include transceiver circuitry for transmitting and/or receiving symbol sequences using radio frequency signals via one or more antennas. Processing unit 210 may include a processor, microprocessor, or processing logic that may interpret and execute instructions. Processing unit 210 may perform all device data processing functions. Memory 215 may provide permanent, semi-permanent, or temporary working storage of data and instructions for use by processing unit 210 in performing device processing functions. Memory 215 may include read only memory (ROM), random access memory (RAM), large-capacity storage devices, such as a magnetic and/or optical recording medium and its corresponding drive, and/or other types of memory devices. Interface 220 may include circuitry for interfacing with a link that connects to transport network 120. Bus 225 may interconnect the various components of device 200 to permit the components to communicate with one another.

The configuration of components of device 200 illustrated in FIG. 2 is for illustrative purposes only. Other configurations with more, fewer, or a different arrangement of components may be implemented.

FIG. 3A illustrates exemplary components of UE 110. UE 110 may include a transceiver 305, a processing unit 310, a memory 315, an input device(s) 320, an output device(s) 325, and a bus 330.

Transceiver 305 may include transceiver circuitry for transmitting and/or receiving symbol sequences using radio frequency signals via one or more antennas. Processing unit 310 may include a processor, microprocessor, or processing logic that may interpret and execute instructions. Processing unit 310 may perform all data processing functions for inputting, outputting, and processing of data including data buffering and device control functions, such as call processing control, user interface control, or the like.

Memory 315 may provide permanent, semi-permanent, or temporary working storage of data and instructions for use by processing unit 310 in performing device processing functions. Memory 315 may include ROM. RAM, large-capacity storage devices, such as a magnetic and/or optical recording medium and its corresponding drive, and/or other types of memory devices. Input device(s) 320 may include mechanisms for entry of data into UE 110. For example, input device(s) 320 may include a key pad (not shown), a microphone (not shown) or a display unit (not shown). The key pad may permit manual user entry of data into UE 110. The microphone may include mechanisms for converting auditory input into electrical signals. The display unit may include a screen display that may provide a user interface (e.g. a graphical user interface) that can be used by a user for selecting device functions. The screen display of the display unit may include any type, of visual display, such as, for example, a liquid crystal display (LCD), a plasma screen display, a light-emitting diode (LED) display, a cathode ray tube (CRT) display, an organic light-emitting diode (OLED) display, etc.

Output device(s) 325 may include mechanisms for outputting data in audio, video and/or hard copy format. For example, output device(s) 325 may include a speaker (not shown) that includes mechanisms for converting electrical signals into auditory output. Output device(s) 325 may further include a display unit that displays output data to the user. For example, the display unit may provide a graphical user interface that displays output data to the user. Bus 330 may interconnect the various components of UE 110 to permit the components to communicate with one another.

The configuration of components of UE 110 illustrated in FIG. 3A is for illustrative purposes only. Other configurations with more, fewer, or a different arrangement of components may be implemented.

Figure 3B:
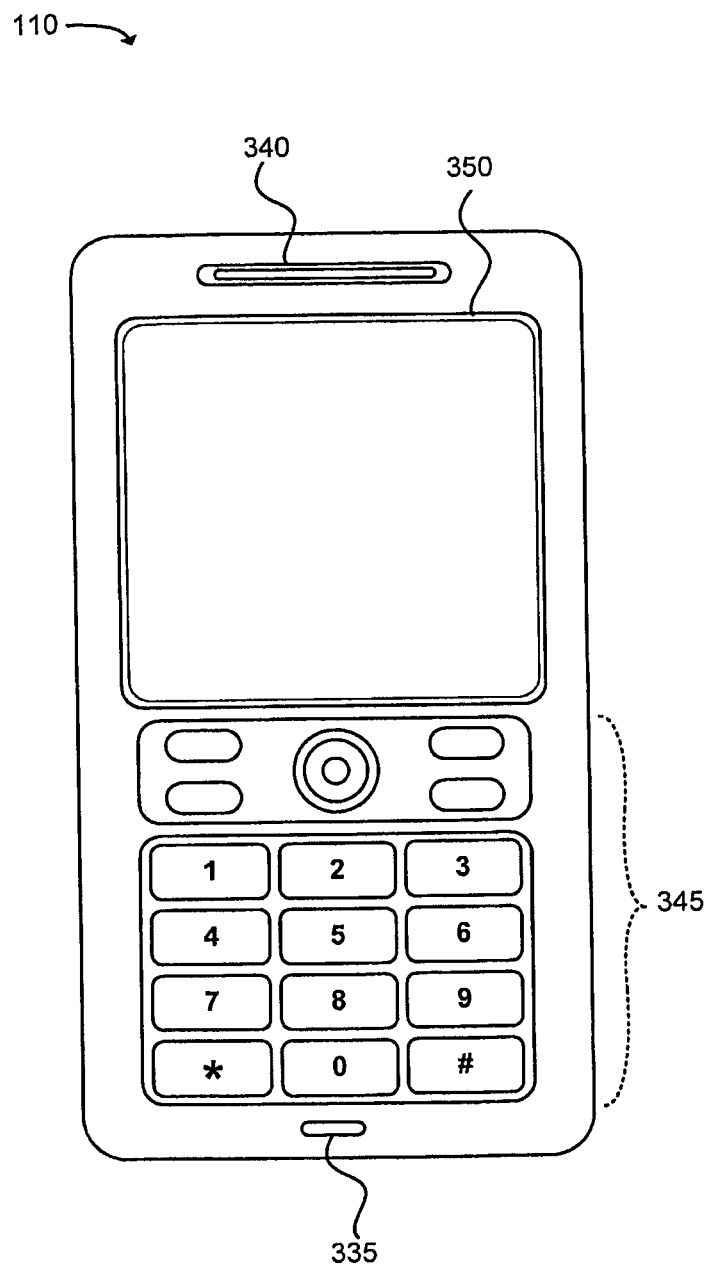
FIG. 3B illustrates an exemplary implementation of the UE of FIG. 3A where the UE includes a cellular radiotelephone.

FIG. 3B illustrates an exemplary implementation of UE 110 in which UE 110 includes a cellular radiotelephone. As shown in FIG. 3B, the cellular radiotelephone may include a microphone 335 (e.g., of input device(s) 320) for entering audio information into UE 110, a speaker 340 (e.g., of output device(s) 325) for providing an audio output from UE 110, a keypad 345 (e.g., of input device(s) 320) for manual entry of data or selection of device functions, and a display 350 (e.g., of input device(s) 320 or output device(s) 325) that may visually display data to the user and/or which may provide a user interface that the user may use to enter data or to select device functions (in conjunction with keypad 345).

Figure 4A:
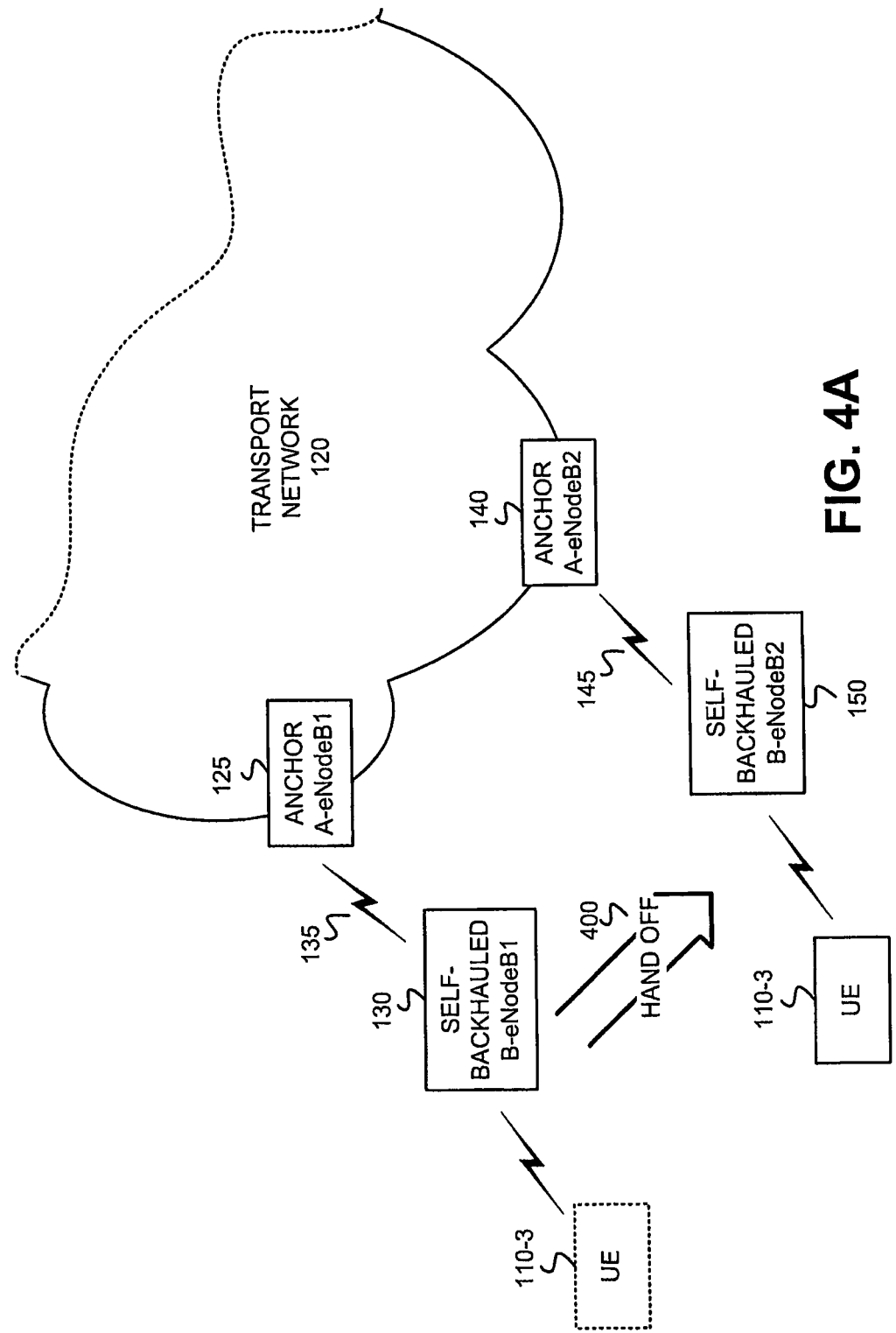
FIGS. 4A and 4B depict an exemplary handoff of a UE from a first self-backhauled eNodeB to a second self-backhauled eNodeB in a wireless communications system.
Figure 4B:
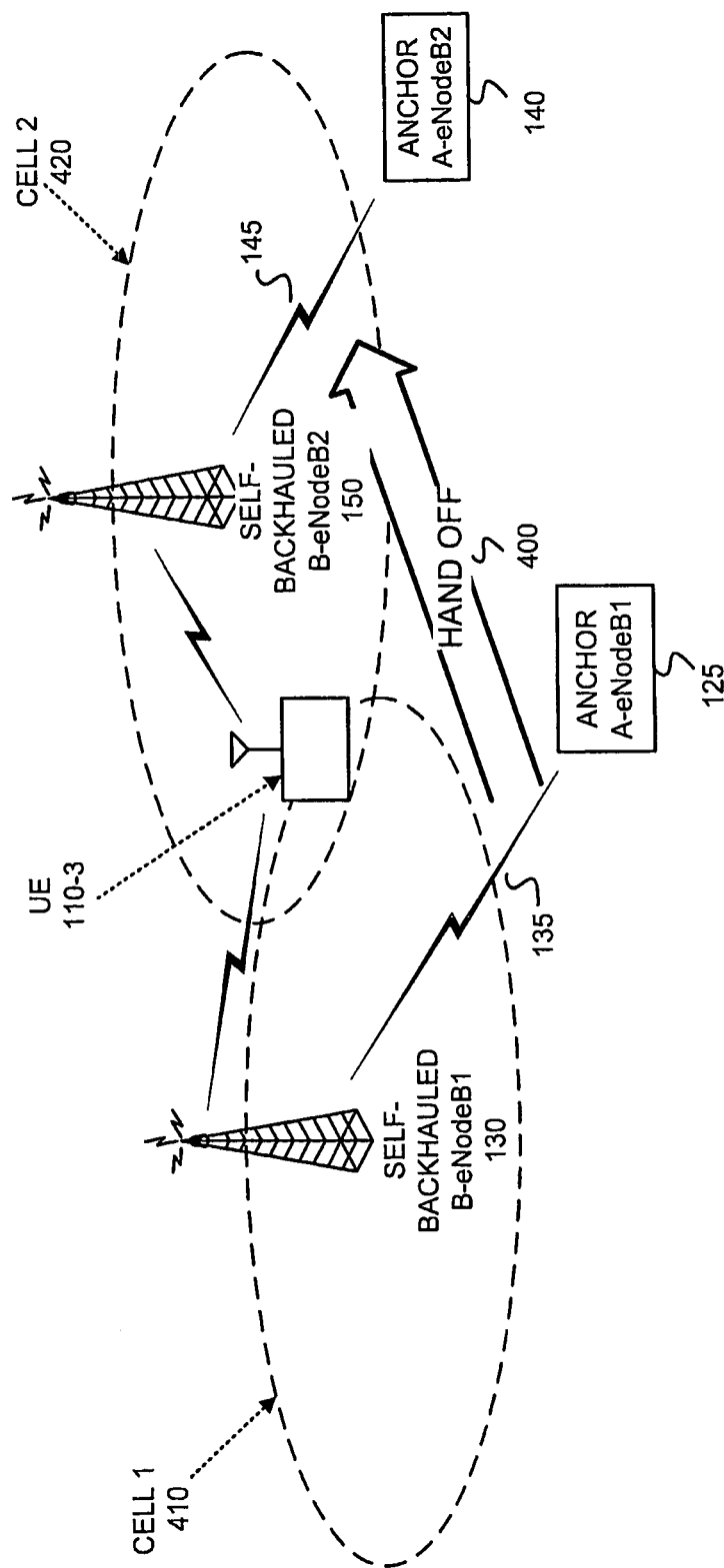

FIGS. 4A and 4B depict UE 110-3 being handed off from self-backhauled eNodeB 130 to self-backhauled eNodeB 150. As shown in FIGS. 4A and 4B. UE 110-3 initially may reside in cell 1 410 that is served by self-backhauled eNodeB 130 via radio interface 135 and anchor eNodeB 125. However, upon entry of UE 110-3 into cell 2 420 that is served by self-backhauled eNodeB 150 via radio interface 145 and anchor eNodeB 140. UE 110-3 may be handed off 400 to self-backhauled eNodeB 150. As shown in FIGS. 4A and 4B, self-backhauled eNodeB 150 may connect to transport network 120 via radio interface 145 and anchor eNodeB 140. Subsequent to hand off 400, self-backhauled eNodeB 150 may serve UE 110-3 via radio interface 145 and anchor eNodeB 140 while UE 110-3 is located in cell 2 420.

Figure 5A:
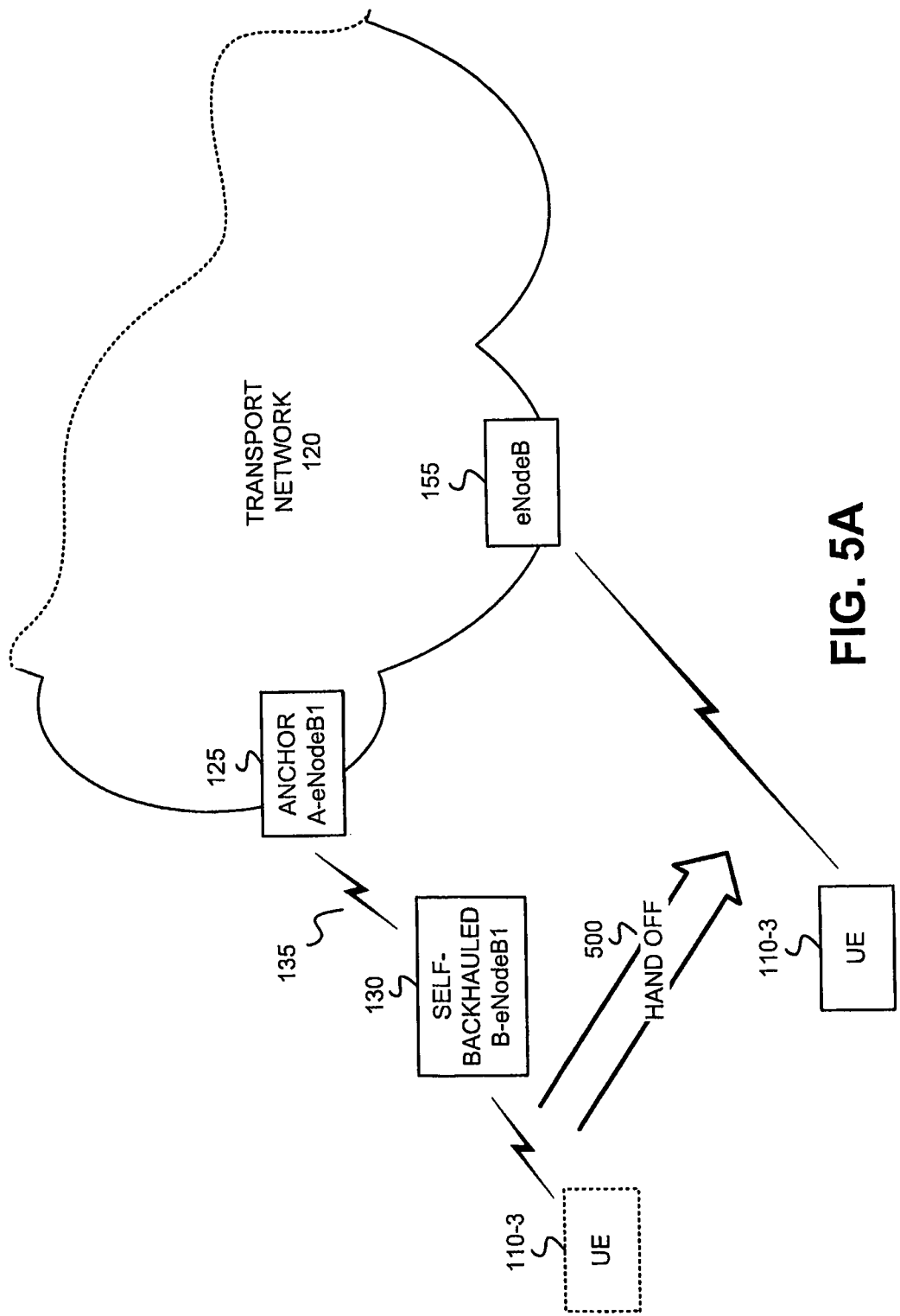
FIGS. 5A and 5B depict an exemplary handoff of a UE from a self-backhauled eNodeB to an eNodeB in a wireless communications system.
Figure 5B:
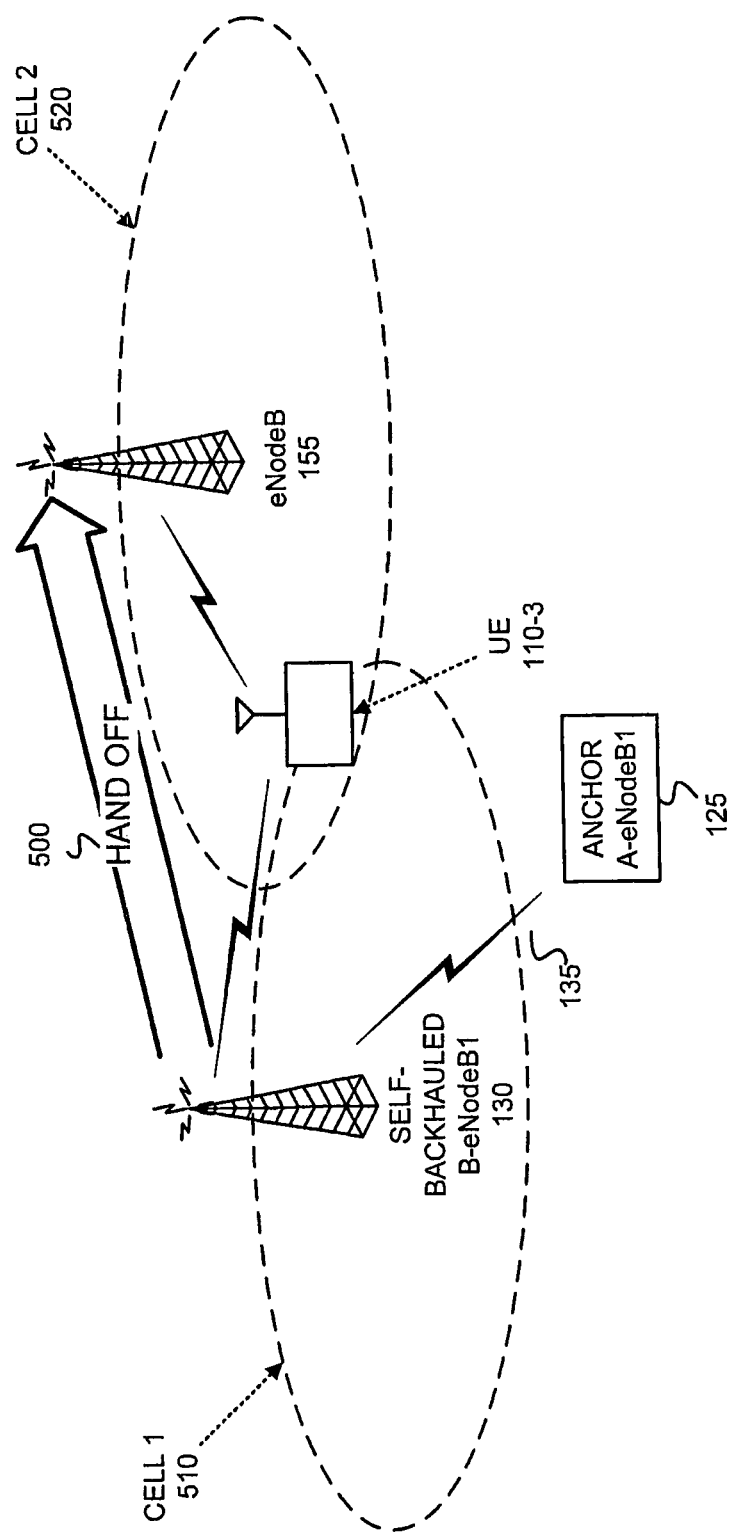

FIGS. 5A and 5B depict UE 110-3 being handed off from self-backhauled eNodeB 130 to an eNodeB that is not a self-backhauled eNodeB (e.g., eNodeB 155). As shown in FIGS. 5A and 5B, UE 110-3 initially may reside in cell 1 510 that is served by self-backhauled eNodeB 130 via radio interface 135 and anchor eNodeB 125. However, upon entry of UE 110-3 into cell 2 520 that is served by eNodeB 155, UE 110-3 may be handed off 500 to eNodeB 155. As shown in FIG. 5A. eNodeB 155 may reside in transport network 120. Subsequent to hand off 500, eNodeB 155 may serve UE 110-3 while UE 110-3 is located in cell 2 520.

In certain circumstances, inefficient routing may occur on the wired part of the transport infrastructure (e.g., transport network 120) during handover packet forwarding from a self-backhauled eNodeB to another eNodeB. Forwarded packets, and also control plane messages sent on X2, may, without modifications described herein, need to be routed via one or more of S-GW 160-1 through 160-N instead of routing directly between the self-backhauled eNodeB and the other eNodeB. This indirect routing of X2 traffic via S-GWs 160 would be inefficient. In aspects described herein, S-GW functionality for self-backhauled cNodeB originated traffic (e.g., for the X2 traffic) may be integrated into the anchor eNodeB serving the self-backhauled eNodeB to enable direct routing for X2 control plane and user plane traffic. Additionally, a separate bearer may be used for the self-backhauled eNodeB to carry the X2 traffic. To achieve the direct routing, the self-backhauled eNodeB may have a different Internet Protocol (IP) address for X2 communication than for S1 communication. Thus, a separate IP address, associated with the S-GW integrated into the A-eNodeB, may be allocated for the self-backhauled cNodeB to be used for X2 traffic. Additionally, a separate radio bearer between the self-backhauled eNodeB and the anchor eNodeB may be established for carrying X2 traffic. The establishment of such a bearer can be performed by signaling from the MME when the self-backhauled eNodeB is set-up/configured. User data originated from UEs served by the self-backhauled eNodeB, however, may still be terminated at a S-GW located in transport network 120, but for X2 data originated from the self-backhauled eNodeB, the serving anchor eNodeB may act as the S-GW.

Figure 6:
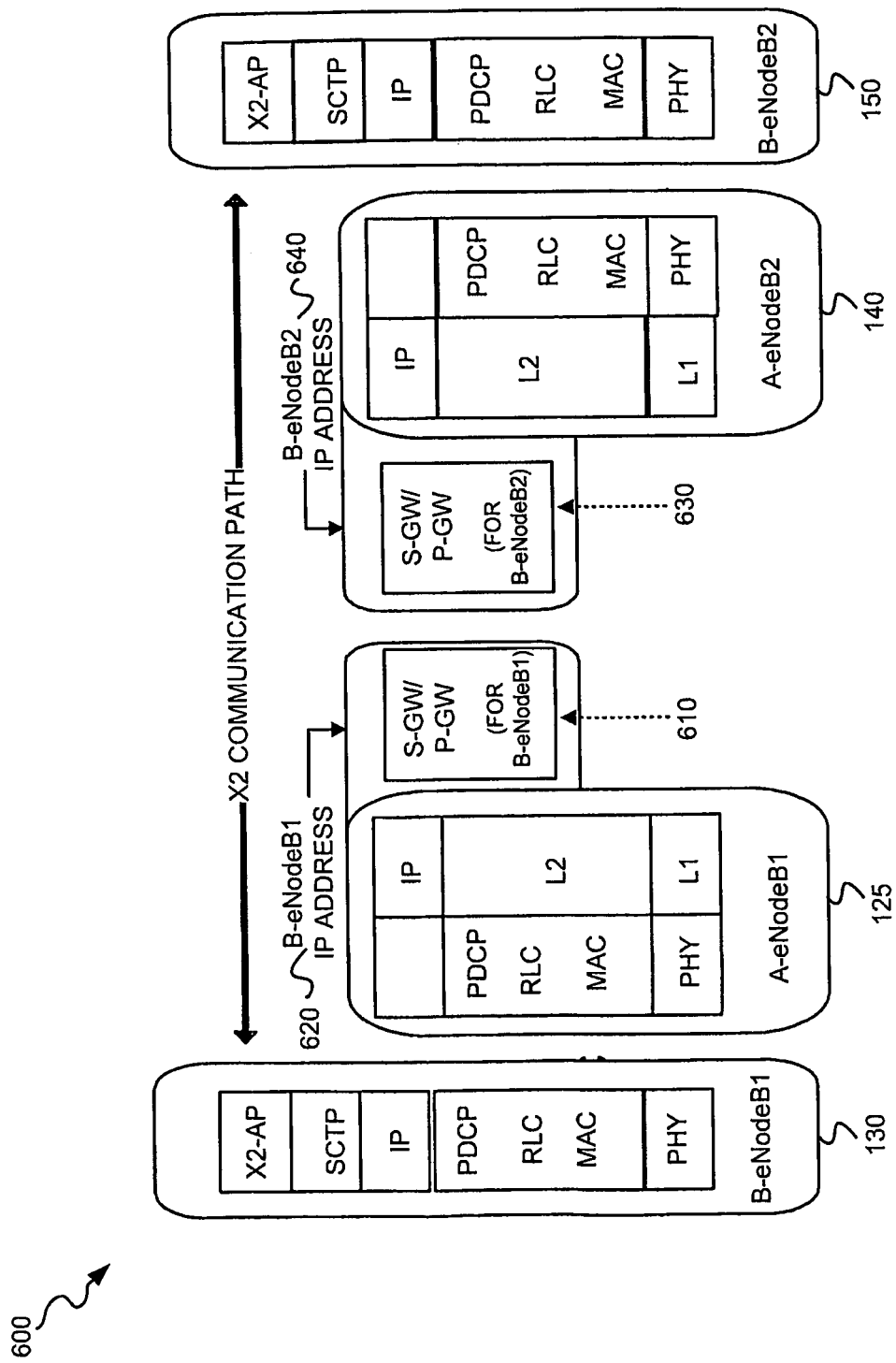
FIG. 6 illustrates protocol stacks associated with X2 traffic at the anchor node (A-eNodeB1) of FIG. 4A according to a, first exemplary implementation.

FIG. 6 illustrates an exemplary protocol architecture 600 for the X2 control plane, where, as described above, S-GW functionality has been integrated into the anchor eNodeBs (e.g., A-eNodeB1 125 and A-eNodeB2 140) to enable direct routing of packets from a self-backhauled eNodeB to another eNodeB. As shown, an S-GW 610 may be integrated into a first anchor eNodeB (A-eNodeB1) 125 that serves a self-backhauled eNodeB (B-eNodeB1) 130. An IP address 620 may be allocated by S-GW 610 for B-eNodeB1 130 to be used for the X2 communication of B-eNodeB1 130. As further shown, an S-GW 630 may be integrated into another anchor eNodeB (A-eNodeB2) 140 that serves self-backhauled eNodeB (B-eNodeB2) 150. An IP address 640 may be allocated by S-GW 630 for B-eNodeB2 150 to be used for the X2 communication of B-eNodeB2 150. X2 traffic may be routed between B-eNodeB1 130 and B-eNodeB2 150 using the IP addresses 620 and 640 allocated by the S-GWs integrated into each of anchor nodes A-eNodeB1 125 and A-eNodeB2 140.

Reservation of a separate IP address for the self-backhauled eNodeB for X2 traffic, by locating the S-GW functionality for X2 into the anchor eNodeB, can also be used for the S1 interface and especially for the S1 control plane (S1-CP). In this manner, it may be possible to avoid the routing of S1-CP messages going to/from one of MMEs 165-1 through 165-M via the S-GW of the self-backhauled eNodeB and instead route these messages directly to the MME serving the self-backhauled eNodeB. The IP address allocated for the self-backhauled eNodeB for the S1-CP messages may or may not be the same as the IP address for X2 communication.

The S-GW functionality (e.g. S-GW 610 and S-GW 630) in the anchor eNodeBs may be configured with packet filtering/classification rules such that it can identify the X2 packets and handle them differently (e.g., by mapping them onto the proper radio bearer and breaking them out into the transport network directly).

Packet classification may include implementing one of more of the following options:

1) classify based on transport network QoS indicators in the packet IP headers or based on the IP address, assuming that the signaling traffic is mapped to a different transport network QoS class;

2) classify based on deep packet inspection in the IP header to inspect upper layer protocol headers (e.g., the Stream Control Transmission Protocol (SCTP) header (in the case of the X2 control plane) or the GTP header (in the case of X2 user plane)); and/or 3) use GTP tunneling-based routing between the S-GW entities in the anchor eNodeBs and classify packets based on the Tunnel Endpoint Identifier (TEID) of the GTP tunnel. In the case where GTP tunneling is used between anchor eNodeBs, it may not be necessary to have a separate IP address for the self-backhauled eNodeB for X2 traffic. The self-backhauled eNodeB may have the same IP address for both X2 and S1 traffic and the anchor eNodeB may filter out the X2 packets (e.g., based on destination address) and send them on the appropriate tunnel toward the target self-backhauled eNode. In this case, a separate radio bearer for the X2 traffic may not be required.

A self-backhauled eNodeB and its serving anchor eNodeB may have their own X2 interface in between them provided that they are neighbors in a radio coverage sense. The breakout of X2 traffic can be useful from the self-backhauled eNodeB/anchor eNodeB X2 interface perspective since, otherwie, the X2 traffic between these two nodes would also be routed via the S-GW, generating back and forth routing between the anchor eNodeB and the S-GW. Similarly, in the case when the two self-backhauled eNodeBs are served by the same anchor eNodeB, use of the implementations described herein may ensure that traffic going in between the two self-backhauled eNodeBs is shortcut in the serving anchor eNodeB without going to the S-GW.

Figure 7:
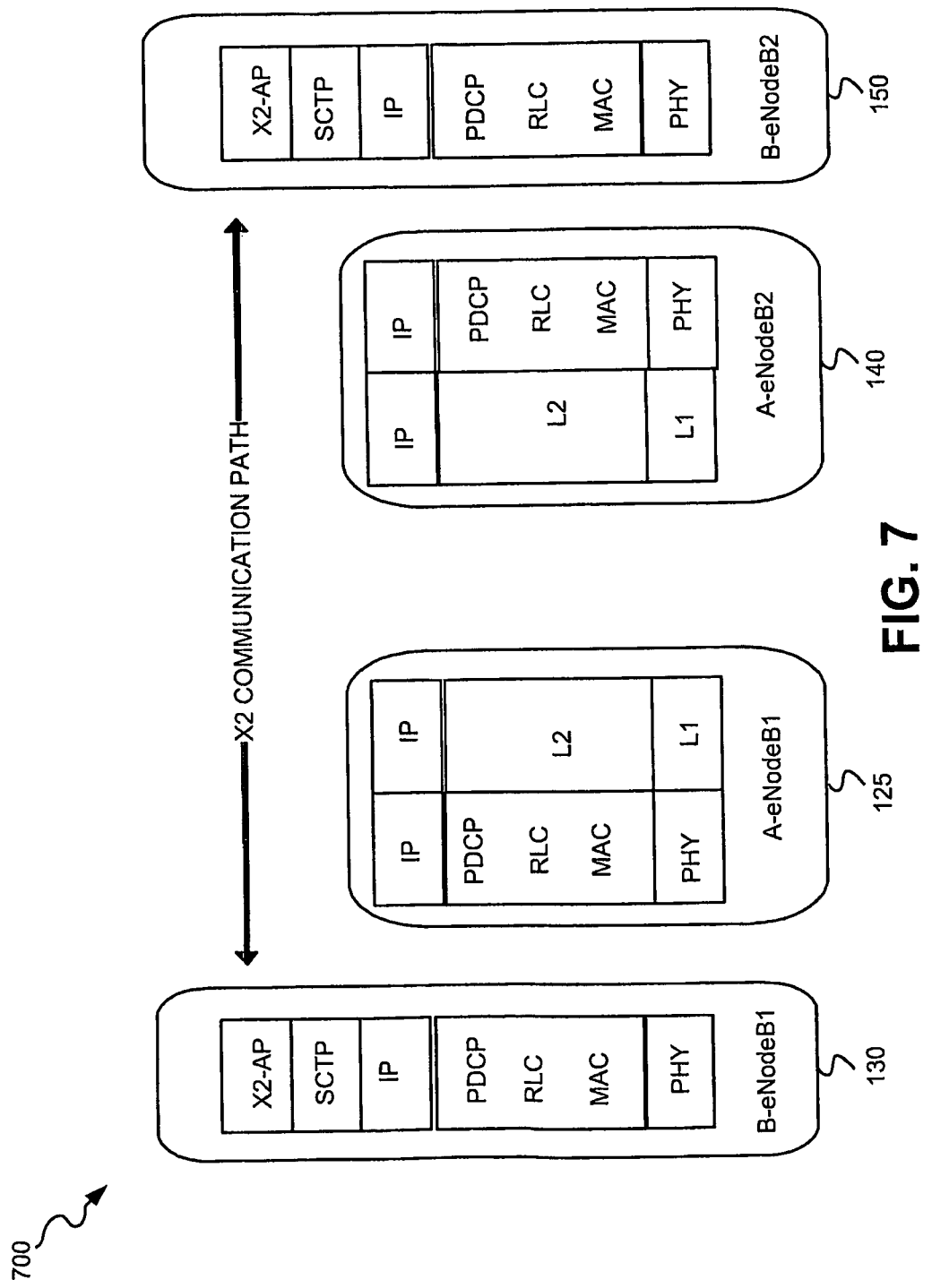
FIG. 7 illustrates protocol stacks associated with X2 traffic at the anchor node (A-eNodeB1) of FIG. 4A according to a second exemplary implementation.

FIG. 7 further illustrates an exemplary protocol architecture 700 where the serving anchor eNodeB (e.g. A-eNodeB1 125) acts as a regular router that is part of the transport network. In this exemplary implementation, packets arriving from a self-backhauled eNodeB (e.g., B-eNodeB1 130) at the anchor eNodeB (A-eNodeB1 125) may be forwarded via an X2 communication path 710 toward their destination on a shortest path determined by an IP routing mechanism.

Figure 10:
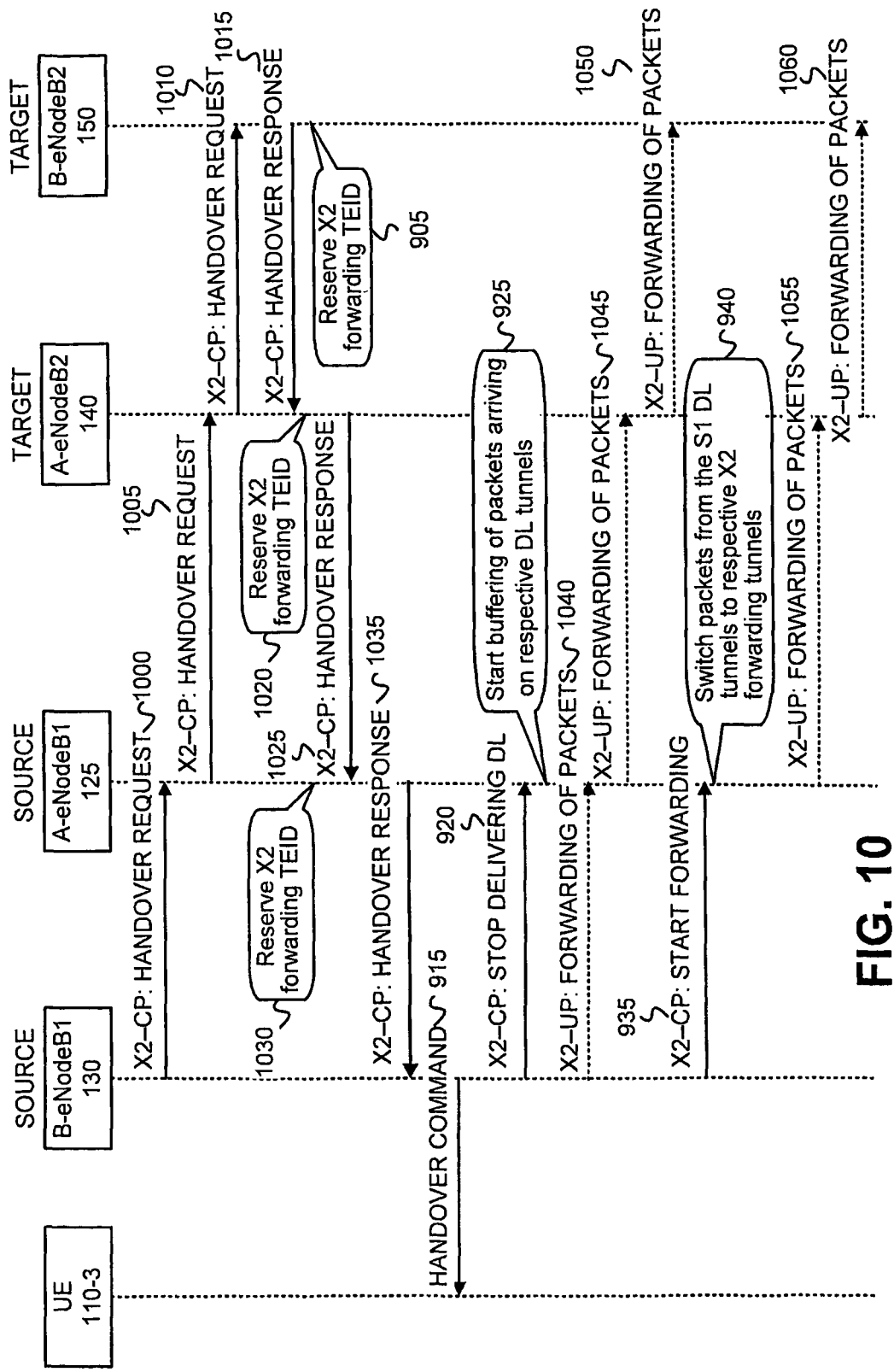
FIG. 10 is a messaging diagram associated with the forwarding of data, during the handoff process of FIG. 8, destined for a UE from the first self-backhauled eNodeB to the second eNodeB according to a second implementation that employs multi-hop signaling.

To control the forwarding of packets at the anchor eNodeB during handover, dedicated signaling may be used between the self-backhauled eNodeB and the anchor eNodeB. The dedicated signaling between the self-backhauled eNodeB and the anchor eNodeB may be based on X2 signaling; on RRC signaling, or on multi-hop X2 signaling (described further below). X2 based signaling between the self-backhauled eNodeB and the anchor eNodeB is described further below with respect to the flow chart of FIG. 8. The signaling between the self-backhauled eNodeB and the anchor eNodeB can also be supported via RRC signaling which may exist between the self-backhauled eNodeB (acting as a UE) and the anchor eNodeB. The RRC signaling may be used to tunnel the "X2 like" messages used for controlling the forwarding from the anchor eNodeB. Multi-hop X2 signaling is depicted in FIG. 10 and further described below. In this exemplary implementation, the X2 signaling messages proceed in a multi-hop fashion via the B-eNodeB1 130, A-eNodeB1 125. A-NodeB2 140 and B-eNodeB2 150 path. In this implementation, the anchor eNodeBs may explicitly be notified about an ongoing handover preparation. As shown in FIG. 10, the user plane tunnels used for packet forwarding at handover may also be established in a multi-hop fashion as the control plane signaling passes through the different nodes.

Figure 8:
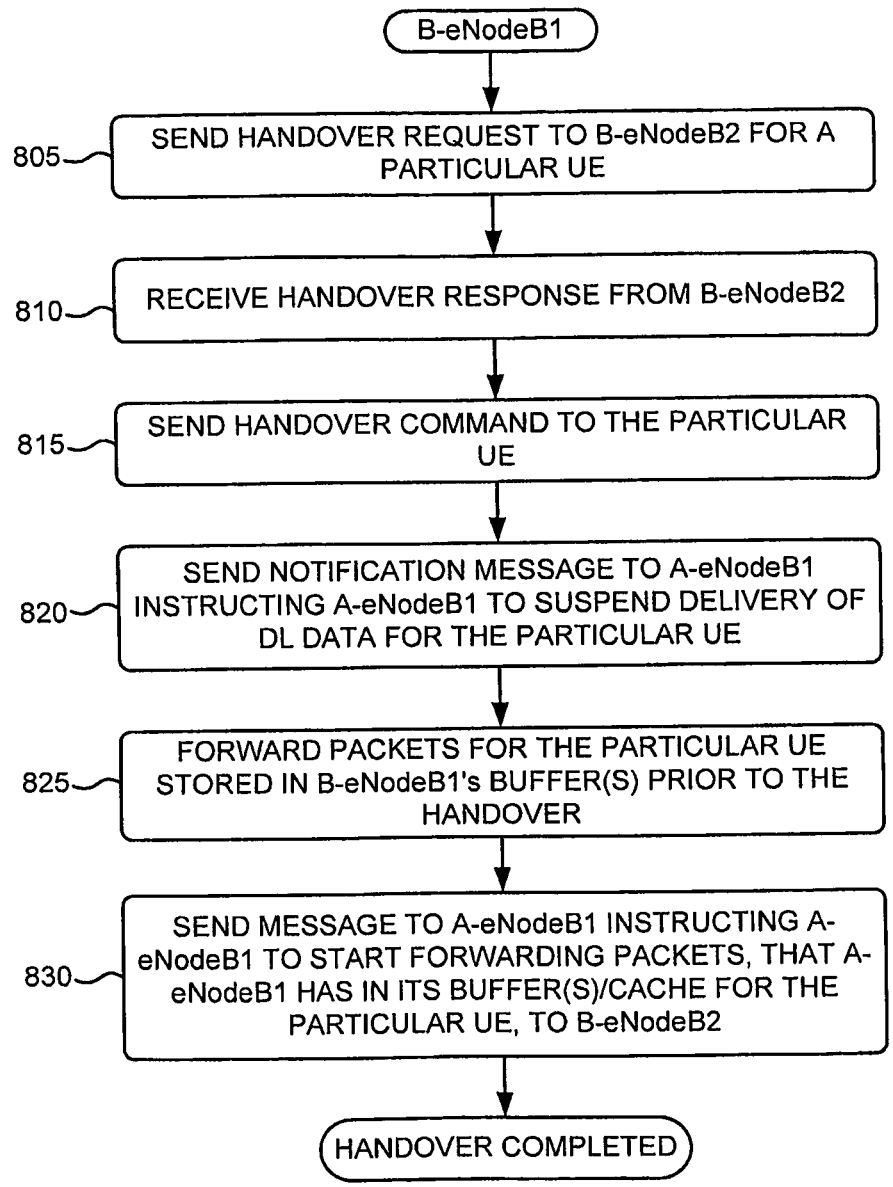
FIG. 8 is a flowchart of an exemplary process associated with the handoff of a UE being served by a first self-backhauled eNodeB to a second self-backhauled eNodeB where dedicated signaling is used between the first self-backhauled eNodeB and the second self-backhauled eNodeB to control the forwarding of data destined for the UE.

FIG. 8 is a flowchart of an exemplary process associated with the handoff of a UE being served by a first self-backhauled eNodeB to a second self-backhauled eNodeB, where dedicated signaling is used between the first self-backhauled eNodeB and the second self-backhauled eNodeB to control the forwarding of data destined for the UE during the handoff. The exemplary process of FIG. 8 may be implemented by self-backhauled eNodeB 130 (B-eNodeB1). The following description of the exemplary process of FIG. 8 is described with reference to the exemplary messaging diagram of FIG. 9 for purposes of illustration.

The exemplary process may begin with sending a handover request to the target self-backhauled eNodeB (e.g., B-eNodeB2 150) for a particular UE (e.g., UE 110-3) (block 805). Once B-eNodeB1 130 decides to make a handover of a particular UE to a target eNodeB (e.g., B-eNodeB2 150). B-eNodeB1 130 initiates handover preparation signaling (e.g., X2 signaling) towards the target eNodeB. As shown in the exemplary messaging diagram of FIG. 9, B-eNodeB1 130 sends a handover request 900 to the handover target eNodeB (e.g., self-backhauled B-eNodeB2 150) via X2 control plane signaling. In an alternative implementation, the handover signaling may be sent via the involved eNodeBs (e.g., B-eNodeB1, A-eNodeB1, B-eNodeB2, A-eNodeB2) in a multi-hop fashion such that each eNodeB interprets the X2 message. For example, as shown in FIG. 10, a handover request may be proceed in a hop-by-hop fashion from B-eNodeB1 130 to A-eNodeB1 125 (e.g., handover request 1000), from A-eNodeB1 125 to A-eNodeB2 140 (e.g. handover request 1005), and from A-eNodeB2 140 to B-eNodeB2 150 (e.g., handover request 1010).

Figure 9:
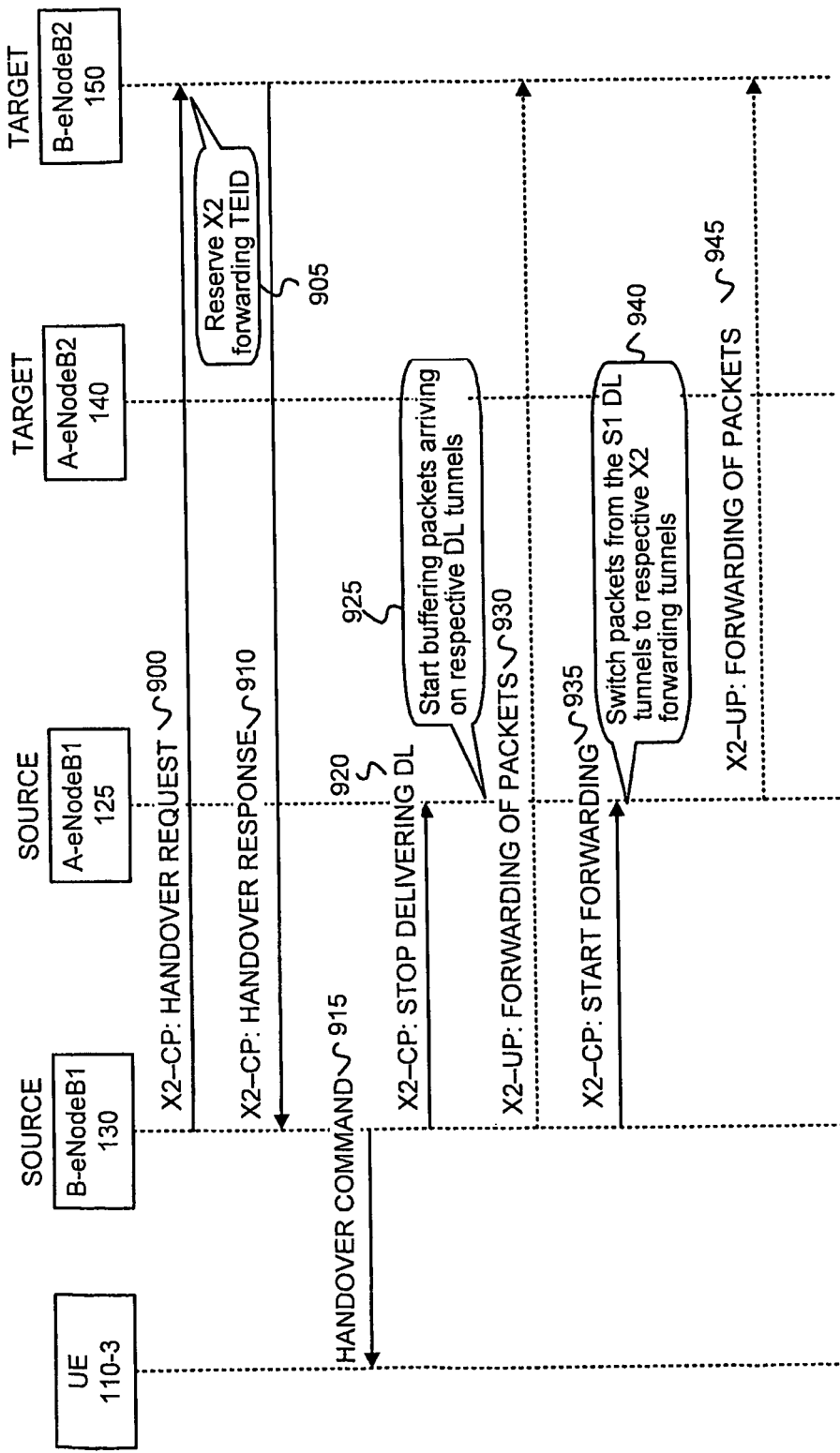
FIG. 9 is a messaging diagram associated with the forwarding of data, during the handoff process of FIG. 8, destined for a UE from the first self-backhauled eNodeB to the second self-backhauled eNodeB according to a first implementation.

Referring back to FIG. 8, a handover response may be received from the handover target eNodeB (e.g., B-eNodeB2) (block 810). Upon receipt of handover request 900. B-eNodeB2 150 may determine whether to grant the handover request and, if the handover request is granted, may return a handover response message 910, as shown in FIG. 9, to B-eNodeB1 130. B-eNodeB2 150 may also reserve 905 an X2 forwarding TEID. In the alternative multi-hop implementation depicted in FIG. 10, a handover response may also be sent via the involved eNodeBs such that each eNodeB may interpret the message. For example, as shown in FIG. 10, B-eNodeB2 150 may reserve 905 an X2 forwarding TEID and may send an X2 handover response to A-eNodeB2 140 via the control plane. A-eNodeB2 140 may further reserve 1020 an X2 forwarding TEED and may send an X2 handover response 1025 to A-eNodeB1 125 via the control plane. A-eNodeB 1 125 may also reserve 1030 an X2 forwarding TEID and may send an X2 handover response 1035 to B-eNodeB 1 130 via the control plane.

Referring back to FIG. 8, a handover command may be sent to the particular UE that is being handed off to the target self-backhauled eNodeB (block 815). Upon receipt of the handover response from the target self-backhauled eNodeB, B-eNodeB1 130 may, as illustrated in FIG. 9, send a handover command 915 to UE 110-3 notifying UE 110-3 of its handoff to the cell serviced by the target self-backhauled eNodeB.

A notification message may be sent to the current serving anchor eNodeB (e.g., A-eNodeB1 125) instructing the anchor eNodeB to suspend delivery of downlink data for the particular UE (block 820). As shown in FIG. 9, B-eNodeB1 130 may send an X2 message 920 in the control plane to A-eNodeB1 125 instructing A-eNodeB1 125 to stop delivering data on the downlink to B-eNodeB1 130 that is intended for the particular UE (e.g. UL 110-3). As further shown in FIG. 9, upon receipt of message 920, A-eNodeB1 125 may begin the buffering 925 of packets arriving on respective downlink (DL) tunnels that are destined for the particular UE. A-eNodeB1 125 may perform caching of packets instead of buffering, which includes keeping a copy of sent packets, but not suspending transmission of the packets. If packet caching is performed by A-eNodeB1 125, A-eNodeB1 125 may indicate to B-eNodeB1 130 an identification of the last packet in its cache (i.e., which B-eNodeB1 130 does not have to forward back). This may be accomplished by introducing a response message (e.g., "Stop delivering DL ACK") sent in response to the "Stop delivering DL" message, carrying the sequence number of the oldest packet in the A-eNodeB cache. B-eNodeB1 130 may identify the UE bearers subject to suspension and buffering via the corresponding S1 interface GTP tunnels (i.e., based on the tunnels that are terminated in the B-eNodeB1) and may include this information in the "Stop delivering DL" message. The inner GTP tunnel IDs (TEID) may not be directly visible in the A-eNodeB and, thus, the A-eNodeB may need to look into the inner header and filter out the bearers belonging to the concerned UE based on the inner GTP header.

Message 920 may be sent at another point in time that is different than that shown in FIG. 9. For example, message 920 may be sent prior to sending handover command 915 to UE 110-3. As another example, message 920 may be sent at a time that is based on a DL buffer saturation level. The order of messages depicted in FIG. 9, therefore, represents one example of message ordering and the messages shown may be sent in a different order than that depicted in FIG. 9.

Referring back to FIG. 8, packets for the particular UE stored in B-cNodeB1's buffer(s) prior to the handover may be forwarded (block 825). As shown in FIG. 9, B-eNodeB1 130 may forward packets 930 to B-eNodeB2 150 using the X2 interface in the user plane. In the alternative multi-hop implementation depicted in FIG. 10, B-eNodeB1 130 may send forwarded packets to A-eNodeB1 125 that may be forwarded, hop-by-hop, to B-eNodeB2 150. For example, as shown in FIG. 10, B-eNodeB1 130 may forward 1040 the packets to A-eNodeB1 125 using the X2 interface in the user plane. In turn, A-eNodeB1 125 may forward 1045 the packets to A-eNodeB2 140 using the X2 interface in the user plane. A-eNodeB2 140 may forward 1050 the packets to B-eNodeB2 150 to complete the hop-by-hop forwarding process.

Referring back to FIG. 8, a message may be sent to A-eNodeB1 instructing A-eNodeB1 to start forwarding packets, that A-eNodeB1 has in its buffer(s) for the particular UE, to the target eNodeB (block 830). B-eNodeB1 130 may send the message to A-eNodeB1 125 after B-eNodeB1 130 finishes the forwarding of packets that were remaining in its buffer(s). As shown in FIG. 9, B-eNodeB1 130 may send a message 935 instructing its anchor node (e.g., A-eNodeB1 125) to forward packets that A-eNodeB1 125 has in its buffer(s)/cache for the particular UE. In response to receiving message 935, as shown in FIG. 9, the anchor node (e.g., A-eNodeB1 125) may switch 940 packets received on S1 downlink tunnels to respective X2 forwarding tunnels. As further shown in FIG. 9, A-eNodeB1 125 may begin forwarding 945 of S1 packets to the target eNodeB (e.g., B-eNodeB2 150).

The exemplary process of FIG. 8 has been described with respect to a handoff from a first self-backhauled eNodeB to a second self-backhauled eNodeB. The exemplary process of FIG. 8, however, may also be applied to a handoff from a self-backhauled eNodeB to an eNodeB that is not a self-backhauled eNodeB.

During the forwarding from A-eNodeB1 125, A-eNodeB1 125 may switch the S1 GTP tunnel, corresponding to a given bearer of the UE, to the appropriate X2 forwarding tunnel toward the A-eNodeB2, which tunnel has been established during handover preparation. In order for A-eNodeB 1 125 to accomplish this, A-eNodeB 1 125 may need to be notified about the forwarding GTP TEIDs valid at the B-eNodeB2 destination. This information may be sent to A-eNodeB1 125 in the "Start Forwarding" message along with the GTP tunnel switching rules (i.e. rules indicating which S1 GTP TEID needs to be switched to which forwarding TEID). B-enodeB2 150 may have to be prepared to accept forwarded packets from an IP address that is different from the B-eNodeB1 130's IP address. Block 830 may complete the handover process.

In other implementations, at least some of the signaling between the B-eNodeB and the A-eNodeB can be supported also via RRC signaling, instead of X2 signaling. The RRC signaling may be used to tunnel the "X2 like" messages used for controlling the forwarding from the A-eNodeB. For example, messages 920 and 935, depicted in FIG. 9, may be tunneled via RRC messages.

The multi-hop signaling implementation depicted in FIG. 10, and described above, permits X2 signaling messages to proceed in a multi-hop fashion via the B-eNodeB1, A-eNodeB1, A-eNodeB2 and B-eNodeB2 path. In this implementation, the anchor eNodeBs may explicitly be notified about an ongoing handover preparation. As shown in FIG. 10, the user plane tunnels used for packet forwarding at handover may also be established in a multi-hop fashion as the control plane signaling passes through the different nodes. The multi-hop signaling implementation may permit the introduction of further optimizations for handover execution when the UE is connected via a self-backhauled eNodeB. Such optimizations may include, for example, the checking of backhaul radio link status (e.g. the availability of resources) at the target A-eNodeB when admitting the UE into the new cell served by the target B-eNodeB. Moreover, the multi-hop signaling implementation may permit the implementation of a direct and more intelligent "sniffing" based implementation where the introduction of new X2 messages may be omitted (see description of a "sniffing" based implementation below). The anchor eNodeB may determine the existence of the ongoing handover procedure and can fetch the necessary information from the bypassed signaling messages in order to execute the packet to forwarding in an autonomous way. In order to support the alternative multi-hop X2 signaling implementation, it may be necessary to extend the normal X2 neighborhood concept with the concept of secondary neighborhood relations. An eNodeB may not only need to maintain its direct neighbors but may also need to maintain the second hop neighbors (i.e., maintain the neighbors of its direct neighbors).

The exemplary implementations described above, involving the use of dedicated signaling between a source self-backhauled eNodeB and a target eNodeB during handover, includes a number extensions that enable the hand-off of a UE from the self-backhauled eNodeB to the target eNodeB. One extension includes the establishment of an X2 interface between the self-backhauled eNodeB and the anchor eNodeB even if they are not neighbors in a radio coverage sense. Another extension involves the X2-AP protocol, or the RRC protocol, for carrying control messages used to control the forwarding from the anchor eNodeB. In the case of X2 based signaling, the X2 signaling may also be implemented in a multi-hop fashion. In a further extension, two additional control messages may be used for controlling the forwarding of data from a source self-backhauled eNodeB to a target eNodeB during handover. One of the control messages may include a "Stop delivering DL" message that instructs the anchor eNodeB to stop delivering packets on the DL for a particular UE to the source self-backhauled eNodeB. Another one of the control messages may include a "Start forwarding" message that instructs the anchor eNodeB to begin forwarding packets intended for the particular UE to the target eNodeB to which the UE is being handed off. The "Stop delivering DL" message may include the GTP TEIDs of UE bearers subject to forwarding. The "Start forwarding" message may include the tunnel switching information that maps the GTP TEID of the UE bearers on S1 to the destination forwarding TEID at the target eNodeB (e.g., B-eNodeB2) on X2. A further extension includes giving the anchor eNodeB the ability to look into the inner GTP header (i.e., into the header fields of the GTP tunnel that is terminated at the target B-eNodeB) to identify and filter out the packets of the bearers that are subject to forwarding.

Another exemplary implementation that may control the forwarding at the anchor eNodeB during handover may involve "sniffing" on signaling at the anchor eNodeB that traverses the anchor eNodeB towards the eNodeB to which a given UE is being handed off. In this exemplary implementation, the anchor eNodeB learns, via sniffing on X2 and/or S1 signaling ongoing between the self-backhauled eNodeB and the target eNodeB to which a UE is being handed off, that handover is going to occur and the anchor eNodeB thereafter executes packet forwarding to the target eNodeB autonomously. In this exemplary implementation, the anchor eNodeB detects the X2 handover preparation signaling messages and, based on, the detected signaling messages, determines which UE is involved in a handover. The anchor eNodeB extracts the forwarding TEIDs associated with the target eNode B (e.g., B-eNodeB2) and associates the bearers of the given UE with the TEIDs on S1. Therefore, the anchor eNodeB also "sniffs" on S1 signaling in order to identify when bearers are set-up/released to a particular UE and maintains a database of UE bearer GTP TEID mapping.

Figure 11:
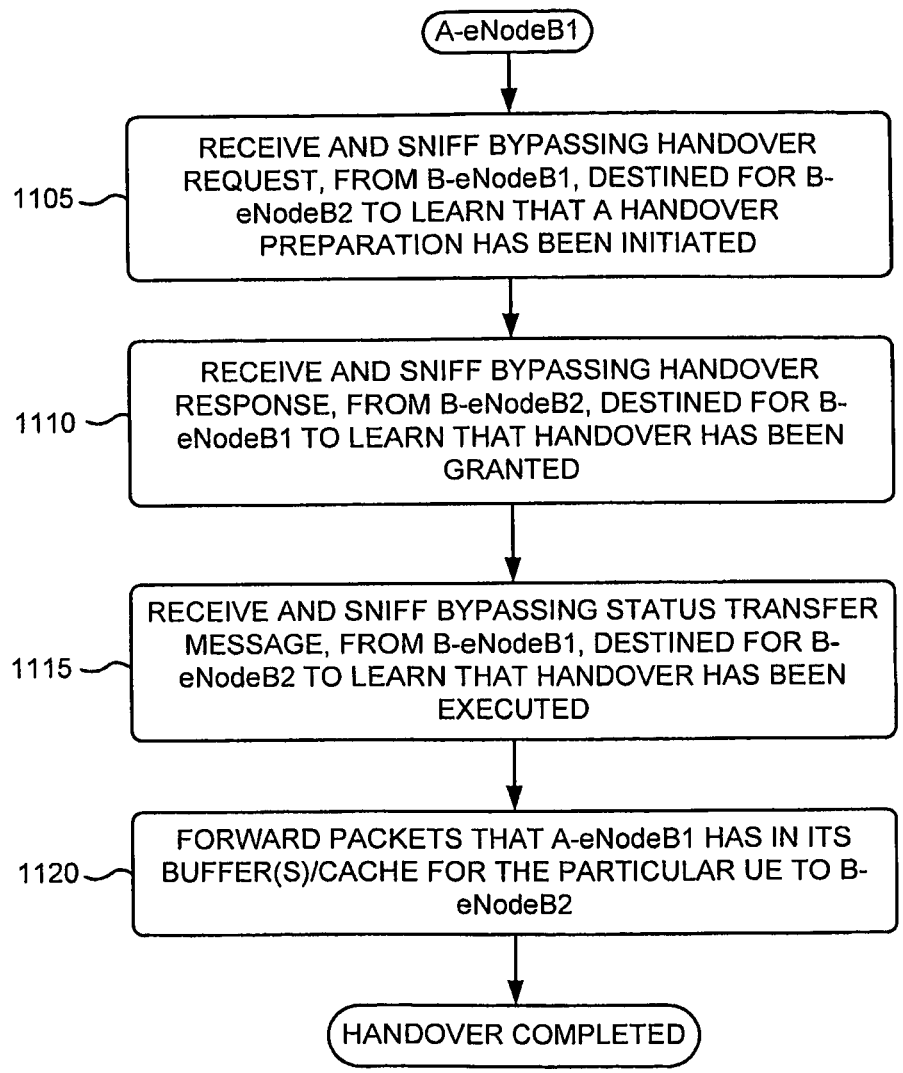
FIG. 11 is a flowchart of an exemplary process associated with the handoff of a UE, being serviced by a first self-backhauled eNodeB, to a second self-backhauled eNodeB, where an anchor eNodeB serving the first self-backhauled eNodeB "sniffs" into messages sent between the first and second self-backhauled eNodeBs.
Figure 12:
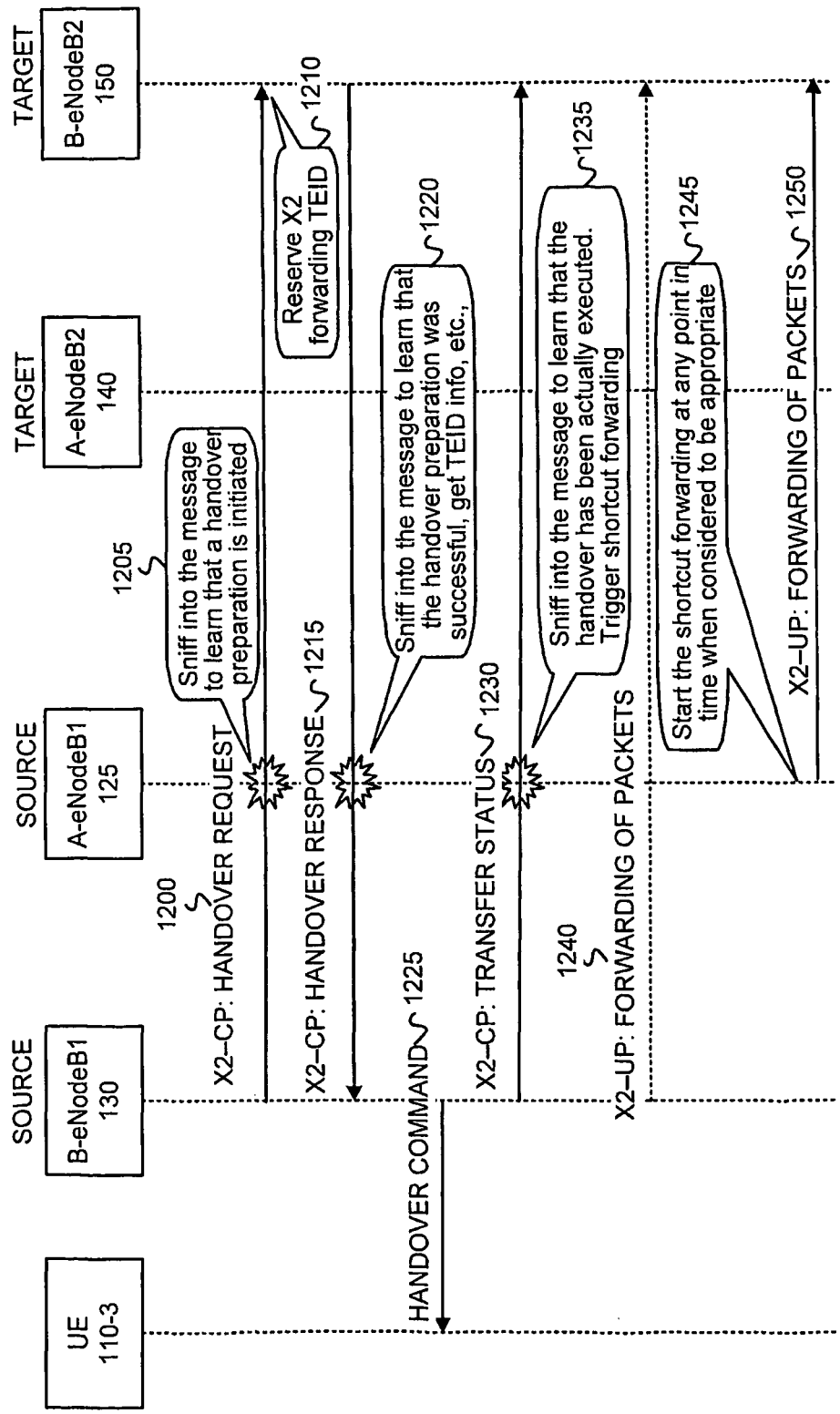
FIG. 12 is a messaging diagram associated with the forwarding of data, during the handoff process of FIG. 10, destined for a UE from the first self-backhauled eNodeB to the second eNodeB according to the exemplary implementation of FIG. 11 that employs "sniffing."

FIG. 11 is a flowchart of an exemplary process associated with the handoff of a UE, being serviced by a first self-backhauled eNodeB, to a second self-backhauled eNodeB, where an anchor eNodeB serving the first self-backhauled eNodeB "sniffs" into messages sent between the first and second self-backhauled eNodeBs to control the forwarding of data destined for the UE during the handoff. The exemplary process of FIG. 11 may be implemented by anchor eNodeB 125 (A-eNodeB1). FIG. 12 illustrates an exemplary messaging diagram associated with the exemplary process of FIG. 11.

The exemplary process may begin with the receipt and "sniffing" of a bypassing handover request, from B-eNodeB1, destined for B-eNodeB2, to learn that a handover preparation has been initiated (block 1105). Once a source eNodeB (e.g., B-eNodeB1 130) decides to make a handover of a particular UE to a target eNodeB (e.g., B-eNodeB2 150), B-eNodeB1 130 initiates handover preparation signaling towards the target eNodeB. As shown in the exemplary messaging diagram of FIG. 12, B-eNodeB1 130 sends a handover request 1200 to the handover target eNodeB via X2 control plane signaling. As the bypassing handover request traverses anchor node A-eNodeB1 125. A-eNodeB1 125 may "sniff" into the message by inspecting the contents of the message. Inspection of the contents of the message may identify that the message is a handover request message, thus, indicating that a handoff of a UE is in progress. A-eNodeB1 125 may also extract a UE identifier from the handover request message and may bind the UE identifier to a particular UE identity used on the S1 interface, which it has learned previously from "sniffing" on S1 signaling. The binding to the S1 UE identity may be needed in order to be able to select the S1 tunnel corresponding to the given UE and to perform forwarding for the correct UE. Upon receipt of handover request 1200. B-eNodeB2 150 may determine whether to grant the handover request and, if the handover request is granted, may return a handover response message 1215, as shown in FIG. 12, to B-eNodeB1 130 via A-eNodeB1 125. B-eNodeB2 150 may also reserve 1210 an X2 forwarding tunnel endpoint identifier (TEID).

Returning to FIG. 11, a bypassing handover response, from B-eNodeB2 150, that is destined for B-eNodeB1 130 may be received and "sniffed" to learn that handover has been granted (block 1110). As shown in FIG. 12, as bypassing handover response message 1215 traverses A-eNodeB1 125 on its way to B-eNodeB1 130, A-eNodeB1 125 may sniff 1220 into the message to learn that the handover preparation was successful and may extract forwarding TEIDs valid at the target B-eNodeB2 from the handover response message. Upon receipt of the handover response message from the target self-backhauled eNodeB (e.g., B-eNodeB2 150), B-eNodeB1 130 may, as illustrated in FIG. 12, send a handover command 1225 to UE 110-3 notifying UE 110-3 of its handoff to the cell serviced by the target eNodeB (e.g. B-eNodeB2 150). Upon receipt of the handover, response message from the target self-backhauled eNodeB, A-eNodeB1 125 may also begin buffering and/or caching received packets that are destined for the UE being handed off. B-eNodeB1 130 may then send a transfer status message 1230 (e.g., an SN transfer status message) to B-eNodeB2 150 via the X2 interface. Transfer status message 1230 may include status information associated with the receiver/transmitter of the source self-backhauled eNodeB (e.g., e-NodeB1 130) such as, for example, sequence numbers of correctly received and/or missing packets.

Returning to FIG. 11, a bypassing status transfer message, from B-eNodeB 1, that is destined for B-eNodeB2 may be received and "sniffed" to learn that handover has been executed (block 1115). As shown in FIG. 12, as bypassing status transfer message 1320 traverses A-eNodeB1 125 on its way to B-eNodeB1 130, A-eNodeB1 125 may sniff 1235 into status transfer message 1230 to learn that the handover has actually been executed. Sniffing into status transfer message 1230 may include inspecting certain contents of status transfer message 1230 to learn that the handover has been executed. Subsequent to transmission of transfer status message 1230. B-eNodeB1 130 may begin forwarding data via X2 in the user plane to B-eNodeB2 150.

Returning to FIG. 11, A-eNodeB1 125 may begin forwarding packets that it has in its buffer(s)/cache for the particular UE to B-eNodeB2 (block 1120). A-eNodeB 1 125 may decide at any point in time, after determining that the handover has been executed, to begin the forwarding. For example, A-eNodeB1 125 may wait a period of time, until B-eNodeB1 130 has completed forwarding all packets it had in its own buffer(s), before commencing forwarding 1245 of packets that A-eNodeB1 125 has in its buffer(s)/cache. Delaying of the forwarding in this fashion may assist in avoiding packet disordering. A-eNodeB1 125 may, in some implementations, sniff on the user plane to determine when B-eNodeB1 130 has completed its forwarding of packets to B-eNodeB2 150. As depicted in FIG. 12, A-eNodeB1 125 may forward 1250 packets via X2 in the user plane to B-eNodeB2 150. Once A-eNodeB1 125 has finished forwarding packets to B-eNodeB2 150, the handover process of FIG. 11 may complete.

The ordering of messages depicted in FIG. 12 is intended to be for purposes of illustration of one specific example, and not intended to be restrictive. A different order of the messages of FIG. 12 may be used in other implementations. When ciphering is employed on the X2 interface (e.g, IPsec) between the source and target self-backhauled eNodeBs, the ciphering (e.g., the IPsec tunnels) should be terminated in the anchor eNodeBs instead of the self-backhauled eNodeBs. Otherwise, the sniffing on X2 messages may be impossible in the anchor eNodeBs.

The exemplary process of FIG. 11 has been described with respect to a handoff from a first self-backhauled eNodeB to a second self-backhauled eNodeB. The exemplary process of FIG. 11, however, may also be applied to a handoff from a self-backhauled eNodeB to an eNodeB that is not a self-backhauled eNodeB.

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 8 and 11, the order of the blocks may be modified in other implementations consistent with the principles of the invention. Further, non-dependent blocks may be performed in parallel.

Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement the embodiments described herein is not limiting of the invention. Thus, the operation and behavior of the embodiments were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising", when used in this specification is taken to specify the presence of stated features, integers, steps, components or groups but does not preclude the presence or addition of one or more other features, integers, is steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A method implemented in an anchor base station of a network, where the anchor base station communicates with a self-backhauled base station via a radio interface and where the network further includes another base station, the method comprising:
    determining whether a user equipment (UE) is being handed off from the self-backhauled base station to the other base station, where the determining is based on receiving a message from the self-backhauled base station via the radio interface instructing the anchor base station to stop delivering packets that are destined for the UE;
    in response to the message instructing the anchor base station to stop delivering packets, starting storing received packets intended for the UE after stopping delivering packets that are destined for the UE; and
    forwarding the stored packets to the other base station via a transport network for delivery to the UE;
    wherein the stored packets comprise first stored packets, wherein the self-backhauled base station stores second stored packets, and wherein forwarding the stored packets to the other base station comprises forwarding the first stored packets from the anchor base station to the other base station after the self-backhauled base station has completed forwarding the second stored packets to the other base station.

2. The method of claim 1, where the other base station comprises another anchor base station that communicates with another self-backhauled base station via another radio interface.

3. The method of claim 2, where forwarding the stored packets to the other base station comprises:
    forwarding the stored packets to the other anchor base station via the transport network for delivery to the UE via the other self-backhauled base station and the other radio interface.

4. The method of claim 2, further comprising:
    allocating an Internet Protocol (IP) address, by the anchor base station, for the self-backhauled base station;
    allocating an IP address, by the other anchor base station, for the other self-backhauled base station; and
    using the IP addresses to forward the stored packets and signaling communication to the other self-backhauled base station.

5. The method of claim 1, where the determining is further based on analyzing one or more messages sent from the self-backhauled base station to the other base station.

6. The method of claim 1, wherein forwarding the stored packets to the other base station comprises forwarding the stored packets to the other base station using serving gateway functionality that is integrated into the anchor base station.

7. The method of claim 6, wherein forwarding the stored packets to the other base station further comprises forwarding the stored packets to the other base station while bypassing other serving gateways in the transport network between the anchor base station and the other base station.

8. The method of claim 1, wherein forwarding the stored packets to the other base station comprises switching packets received on S1 downlink tunnels to respective X2 forwarding tunnels.

9. The method of claim 1, further comprising receiving a message from the self-backhauled base station via the radio interface instructing the anchor base station to begin forwarding the stored packets intended for the UE to the other base station.

10. A method implemented in an anchor base station of a network, where the anchor base station communicates with a self-backhauled base station via a radio interface and where the network further includes another base station, the method comprising:
    determining whether a user equipment (UE) is being handed off from the self-backhauled base station to the other base station by analyzing one or more messages sent between the self-backhauled base station and the other base station;
    storing at the anchor base station, based on the determination of whether the UE is being handed off, received packets intended for the UE; and
    forwarding the stored packets to the other base station via a transport network for delivery to the UE;
    wherein the stored packets comprise first stored packets;
    wherein the self-backhauled base station stores second stored packets; and
    wherein forwarding the stored packets to the other base station comprises forwarding the first stored packets from the anchor base station to the other base station after the self-backhauled base station has completed forwarding the second stored packets to the other base station.

11. The method of claim 10, wherein forwarding the first stored packets to the other base station comprises forwarding the first stored packets to the other base station using serving gateway functionality that is integrated into the anchor base station.

12. The method of claim 10, wherein forwarding the first stored packets to the other base station further comprises forwarding the first stored packets to the other base station while bypassing other serving gateways in the transport network between the anchor base station and the other base station.

13. The method of claim 10, wherein forwarding the first stored packets to the other base station comprises switching packets received on S1 downlink tunnels to respective X2 forwarding tunnels.

14. A method implemented in an anchor base station of a network, where the anchor base station communicates with a self-backhauled base station via a radio interface and where the network further includes another base station, the method comprising:
receiving a message from the self-backhauled base station or from the other base station;
determining, based on the received message, whether a user equipment (UE) is being handed off from the self-backhauled base station to the other base station;
stopping at the anchor base station, based on the determination of whether the UE is being handed off, delivery to the self-backhauled base station of packets destined for the UE;
after receiving the message, starting storing at the anchor base station, based on the determination of whether the UE is being handed off, the packets destined for the UE for which delivery to the self-backhauled base station is stopped; and
forwarding the stored packets to the other base station via a transport network for delivery to the UE;
wherein the stored packets comprise first stored packets, wherein the self-backhauled base station stores second stored packets, and wherein forwarding the stored packets to the other base station comprises forwarding the first stored packets from the anchor base station to the other base station after the self-backhauled base station has completed forwarding the second stored packets to the other base station.

15. The method of claim 14 wherein determining comprises determining, based on the received message, whether a user equipment (UE) is being handed off from the self-backhauled base station to the other base station by analyzing one or more messages sent between the self-backhauled base station and the other base station.

16. The method of claim 1 wherein the anchor base station is an anchor eNodeB base station, wherein the self-backhauled base station is a self-backhauled eNodeB base station, and wherein the radio interface between the anchor eNodeB base station and the self-backhauled eNodeB base station is an Long Term Evolution (LTE) radio interface.

17. The method of claim 16 wherein the message is transmitted using X2 and/or Radio Resource Control (RRC) signaling over the LTE radio interface.

18. The method of claim 14 wherein the anchor base station is an anchor eNodeB base station, wherein the self-backhauled base station is a self-backhauled eNodeB base station, and wherein the radio interface between the anchor eNodeB base station and the self-backhauled eNodeB base station is an Long Term Evolution (LTE) radio interface.

19. The method of claim 18 wherein the message is transmitted using X2 and/or Radio Resource Control (RRC) signaling over the LTE radio interface.

* * * * *